US012165487B2

(12) United States Patent
Nam

(10) Patent No.: US 12,165,487 B2
(45) Date of Patent: *Dec. 10, 2024

(54) FABRIC WITH EMBEDDED INFORMATION BEACON

(71) Applicant: Kiyeon Nam, Bayside, NY (US)

(72) Inventor: Kiyeon Nam, Bayside, NY (US)

( * ) Notice: Subject to any disclaimer, the term of this patent is extended or adjusted under 35 U.S.C. 154(b) by 13 days.

This patent is subject to a terminal disclaimer.

(21) Appl. No.: 18/160,482

(22) Filed: Jan. 27, 2023

(65) Prior Publication Data

US 2023/0245546 A1      Aug. 3, 2023

Related U.S. Application Data

(63) Continuation of application No. PCT/US2021/043284, filed on Jul. 27, 2021.

(60) Provisional application No. 63/057,271, filed on Jul. 27, 2020.

(51) Int. Cl.
*G08B 21/02* (2006.01)

(52) U.S. Cl.
CPC ...... *G08B 21/0288* (2013.01); *G08B 21/0211* (2013.01); *G08B 21/0269* (2013.01); *G08B 21/0277* (2013.01)

(58) Field of Classification Search
CPC ............ G08B 21/0288; G08B 21/0211; G08B 21/0269; G08B 21/0277; G08B 21/0291; G08B 13/1427; G01S 19/14; G01S 19/35; A41D 1/002
See application file for complete search history.

(56) References Cited

U.S. PATENT DOCUMENTS

| 2006/0162156 A1* | 7/2006 | Reed ................... H01L 23/3135 |
| | | 29/841 |
| 2009/0094723 A1 | 4/2009 | Doda, Jr. |
| 2013/0321168 A1* | 12/2013 | Mahony ................. A61B 5/318 |
| | | 340/870.07 |
| 2016/0183603 A1 | 6/2016 | Matthews |
| 2016/0286877 A1 | 10/2016 | Thierry |

OTHER PUBLICATIONS

International Search Report for PCT/US2021/043284 dated Nov. 4, 2021.
Written Opinion for PCT/US2021/043284 dated Nov. 4, 2021.

* cited by examiner

*Primary Examiner* — An T Nguyen
(74) *Attorney, Agent, or Firm* — United One Law Group LLC; Kongsik Kim; Jhongwoo Peck

(57) ABSTRACT

A wearable locator system includes a washable information beacon, which includes a microprocessor, a rechargeable battery, a wireless power supply, a GPS circuit, a wireless transceiver, and a memory. The washable information beacon is housed in a protective shell that allows for complete watertight encapsulation and thermal insulation thereby protecting the washable information beacon during wear, washing, high-heat drying, and high-heat ironing without impairing a transmission of electromagnetic waves between the washable information beacon and an external reader. The protective shell is formed from a low pressure molding process. The wearable locator system further includes a fabric material having the washable information beacon semi-permanently affixed thereto.

14 Claims, 22 Drawing Sheets

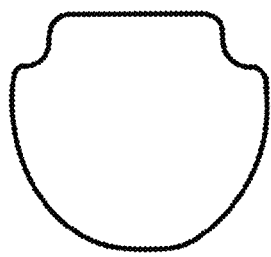
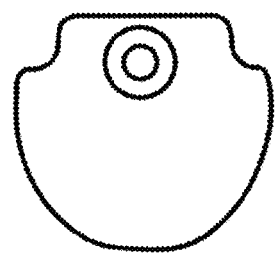
FIG. 8A FIG. 8B
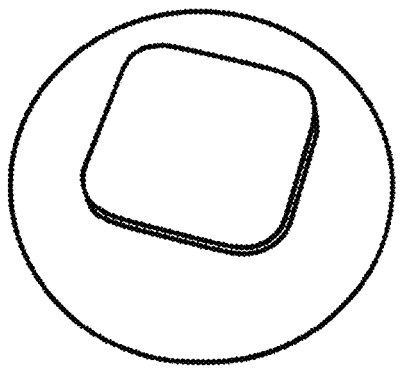
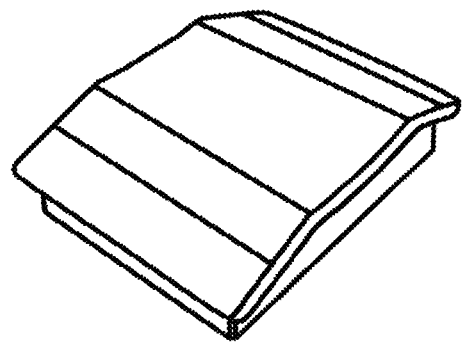
FIG. 9A FIG. 9B

Energy Harvesting Option 2

Solar energy photovoltaic panel charging

Solar energy photovoltaic panel charging
FIG. 18
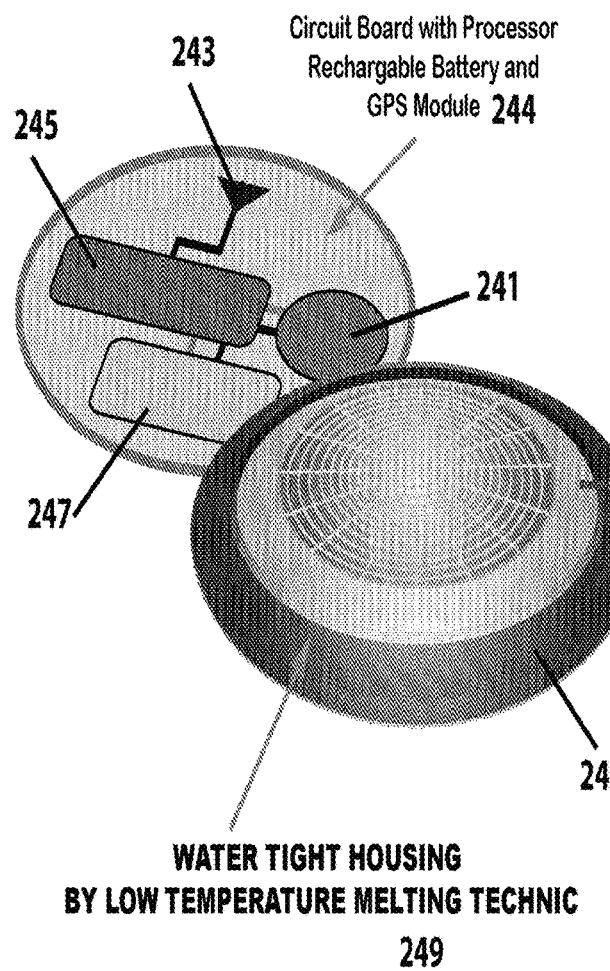
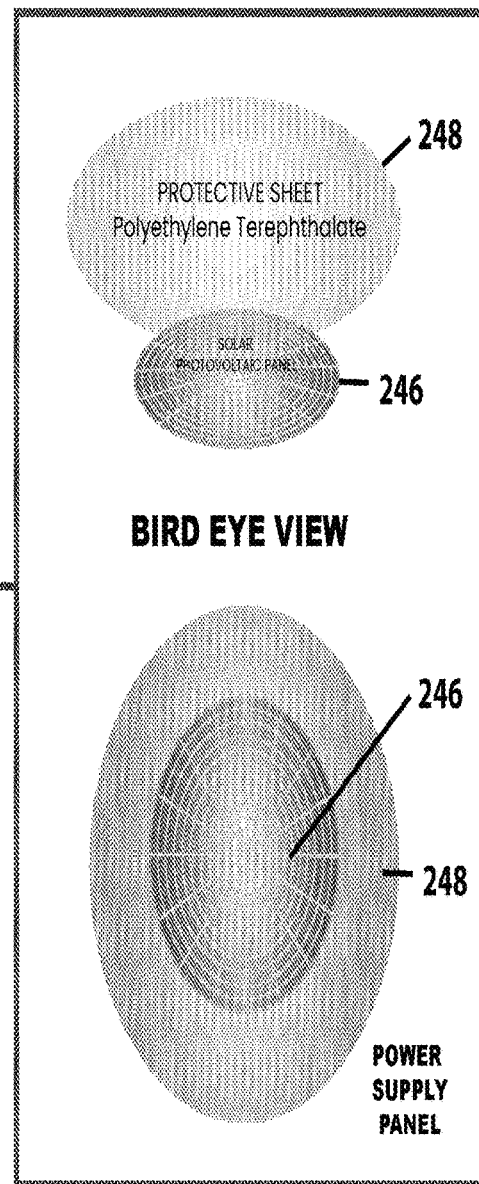

Thermoelectric generator charging

Hybrid charging   FIG. 22
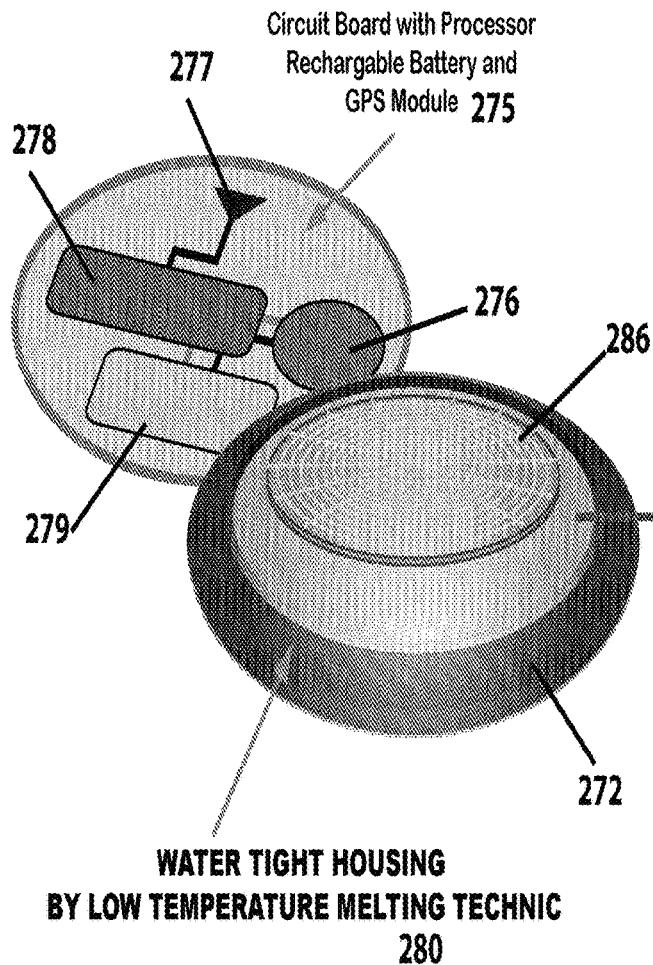
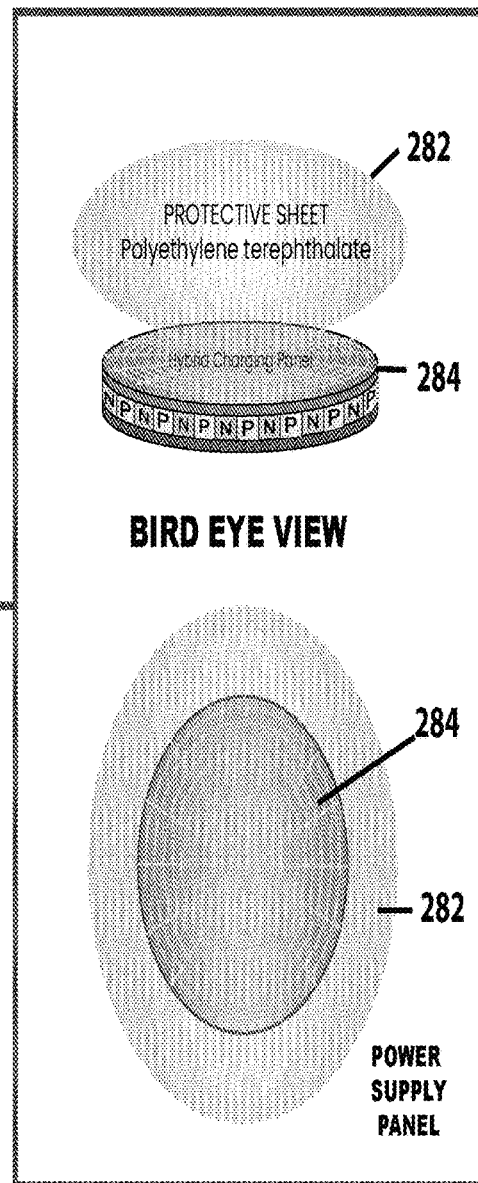

Embeding Method 1
Sewing
Embeding Method 2
Bonding
Embeding Method 3
Magnetics Detachable
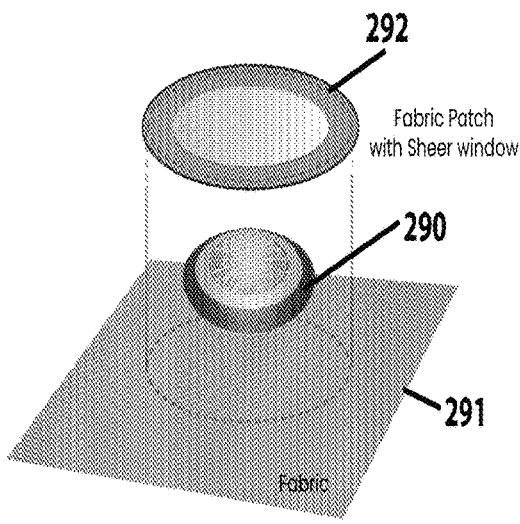
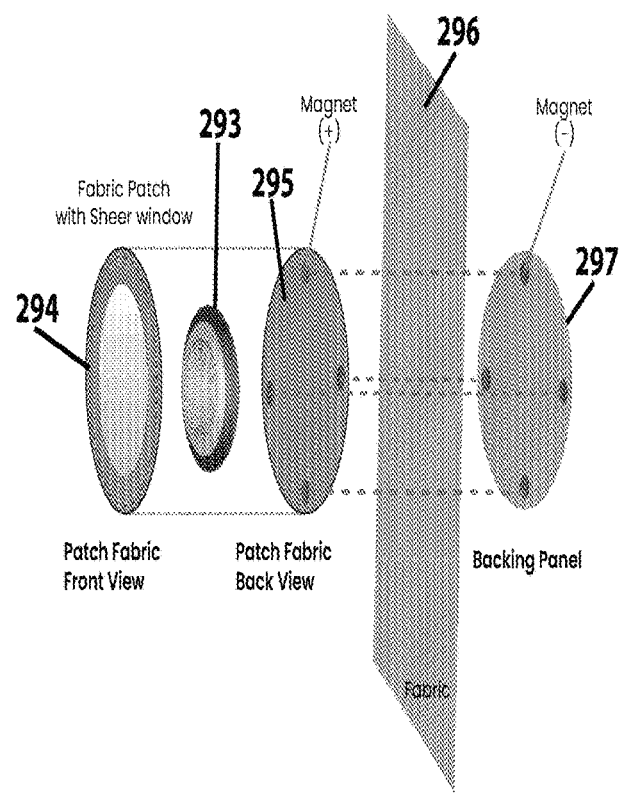
FIG. 23
FIG. 24

FABRIC WITH EMBEDDED INFORMATION BEACON

CROSS-REFERENCE TO RELATED APPLICATION

This application is a Continuation of International Application No. PCT/US2021/043284 filed on Jul. 27, 2021, which claims priority to U.S. Provisional Application No. 63/057,271, filed on Jul. 27, 2020. The aforementioned applications are incorporated herein by reference in their entireties.

BACKGROUND

According to the National Center for Missing and Exploited Children, nearly 800,000 children are reported missing each year in the United States, or 2,000 cases per day. Abductions by strangers are reported to account for 115 of those cases each year. While many children are quickly located, the time interval between a report and reunion with the child can be a frightening experience for all involved.

Wearable tracking and locating systems have been proposed in the past, but few have met with widespread acceptance. In the most simplistic example, a parent can place a locator beacon in the child's clothing itself, such as in a pocket. Since the beacon is not physically joined to the child in any way, it can easily be removed, misplaced, fall out, or otherwise become separated from the child.

Other attempts to solve the problem have involved locator beacons that are insufficiently integrated into clothing and can be easily removed by simply lifting the beacon out of the bag, cutting it away, or tearing it out. Further, conventional sensors that are visible from the exterior (or otherwise known) may alert an abductor regarding the presence of the beacon.

Other solutions require bulky, unsightly, and non-washable hardware that detracts from the appearance and functionality of the clothing article. Such an inelegant design can detract from the overall appearance and visual impact of an article and may be unattractive to consumers.

Prior solutions have often been limited to the single purpose of pinpointing the location of the article. However, other information embedded in a beacon could be valuable to the manufacturer or consumer.

Prior solutions also fail to identify the parent or guardian of a lost child. In the case of an especially young child, the child may not know a parent's phone number, their address, or other identifying information.

While of perhaps lower concern to an individual, lost personal items—such as clothing, luggage, and accessories—are a continuous problem in everyday life, with the consequences ranging from modest inconvenience to significant economic loss. A misplaced or stolen handbag, for example, can result in a loss of several hundred dollars (a consumer-grade Coach bag, for example) up to nearly $100,000 in the "super-luxury" category that includes certain animal skin bags from Hermes, Bottega Veneta, and others. Compounding the loss of the bag itself may be the loss of its contents, which may include cash, electronics, and even personal items that may be irreplaceable.

Oftentimes a loss is outside the control of the user. For example, even though the rate of bags lost by airlines has been decreasing, industry baggage handlers misplaced an estimated 21.8 million bags in 2013. While more than 80% of these lost bags were ultimately simple delays in transit, over 4 million bags experienced severe delays or were never located. In addition to economic loss, these millions of passengers were inconvenienced, perhaps far from home.

Further, people frequently entrust their belongings to coat check agents, hotel bellmen, porters, doormen, and others, with the result sometimes being an article that has been misplaced, stolen, or given to the wrong person.

Lost articles are not the only concern. The authenticity of goods, particularly high-end brands, is important to consumers and designers alike. The quantity and value of counterfeit goods has grown significantly in recent years and by some estimates exceeds $200B each year. According to U.S. Customs and Border Protection's 2013 statistics, handbags and wallets were the top category for counterfeiters in terms of dollar value. That year, CBP seized 2,200 shipments in this category alone with an MSRP value of $700M, accounting for 40% of the value of all goods seized across all categories. Clothing and apparel was the number four category in 2013 with over $116M in counterfeit goods, representing 7% of the total. The European Union has a similar problem with an estimated 26B in counterfeit clothing and accessories entering the market each year, according to the Office for Harmonization in the Internal Market.

Customs agents and manufacturers have limited means available to combat counterfeiting, including visual inspections, examination at ports of entry, educational campaigns, and the like. Despite greater attention to the problem, the economic impact remains severe.

Proposed solutions for tracking lost articles suffer many of the same drawbacks as those identified with systems for tracking lost children, namely integration into existing materials, conspicuousness, and reliability under varied environmental conditions.

What is thus needed is a means for integrating a washable device into an article of clothing or accessory where the integration is semi-permanent and resistant to tampering, removal, or even detection by a would-be thief.

What is further needed is a means for providing an embedded device that identifies its location, and which can be integrated into an article of clothing or accessory, and which is not impacted by washing the article.

What is further needed is an embedded device that provides identifying information, such as parental contact information, or in the case of a lost article, ownership information or confirmation of authenticity.

BRIEF DESCRIPTION OF THE DRAWINGS

The features and advantages of the present disclosure will be more fully understood with reference to the following detailed description when taken in conjunction with the accompanying figures, wherein:

FIGS. 8A-8B show the top and bottom sides of an exemplary information beacon after application of an outer shell.

FIGS. 9A-9B show exemplary communication gateways for use with embodiments of the present invention.

FIG. 18 shows a housing of a washable information beacon.

FIG. 22 shows a housing of a washable information beacon.

FIG. 23 shows a washable information beacon and its fabric layers.

FIG. 24 shows a washable information beacon, its fabric layers and magnetic panels.

SUMMARY

In some implementations, a wearable locator system can comprise a washable information beacon having a microprocessor, a rechargeable battery, a wireless power supply, a GPS circuit, a wireless transceiver, and a memory, the microprocessor, the rechargeable battery, the wireless power supply, the GPS circuit, the wireless transceiver, and the memory being housed in a protective shell that allows for complete watertight encapsulation and thermal insulation thereby protecting the microprocessor, the power supply, the wireless transceiver, and the memory during wear, washing, high-heat drying and high-heat ironing without impairing a transmission of electromagnetic waves between the washable information beacon and an external reader, the protective shell being formed from a low pressure molding process; and a fabric material having the washable information beacon semi-permanently affixed thereto.

In some implementations, the wireless power supply can be one of an induction module, a solar cell module, a thermoelectric module, and combinations thereof.

In some implementations, the fabric material can be a composite material formed from a plurality of layers where the first layer is joined to the second layer such that the information module is semi-permanently embedded therebetween. In some implementations, the composite material can be formed prior to being cut into individual garments. In some implementations, the composite material can be joined with an adhesive. In some implementations, the composite layer can be formed with stitching. In some implementations, the stitching can form a pocket in which the washable information beacon is disposed.

In some implementations, the protective shell can be formed from one of a polymer, an epoxy, and a foam. In some implementations, the protective shell can protect the microprocessor, the rechargeable battery, the wireless power supply, the GPS circuit, the wireless transceiver, and the memory of the washable information beacon from temperatures of 145 degrees or higher. In some implementations, the wearable locator system can further comprise: a communication gateway, wherein the washable information beacon is paired with the communication gateway to record the comings and goings of the washable information beacon within a specified environment.

DETAILED DESCRIPTION

A novel fabric system with washable information beacon is disclosed in which an information beacon may be permanently installed, which is not impaired by washing, regular wear by a child, travel, and other environmental factors.

Figure 1:
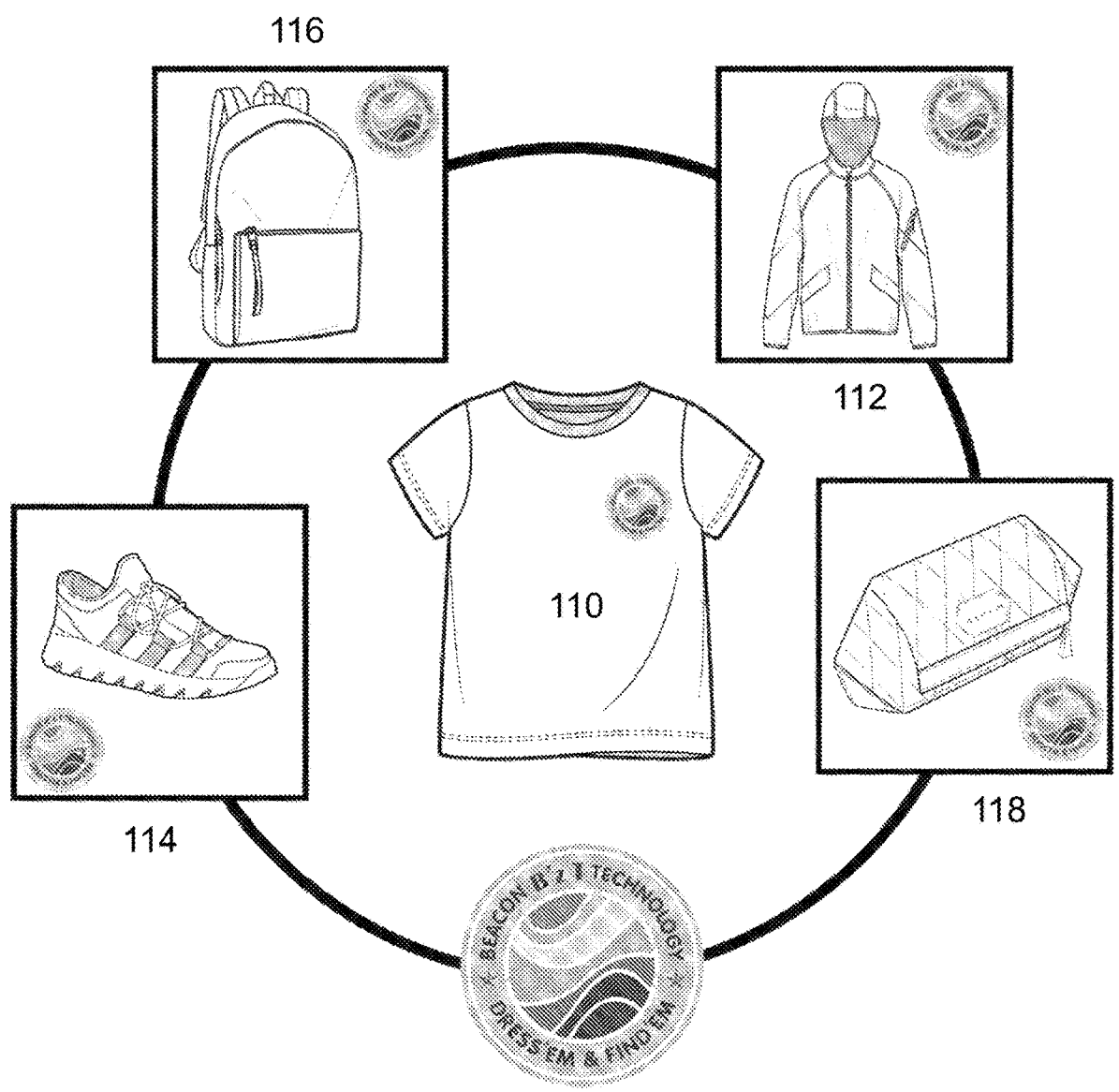
FIG. 1 shows an overview of possible usage scenarios for embodiments of the invention.

FIG. 1 shows an overview of an exemplary system in which information beacons may be integrated into a variety of products to provide enhanced location and security functionality. In a preferred embodiment, an information beacon may be incorporated into the fabric of a garment such as a T-shirt 110, as well as other personal garments such as pants, jeans, tops, sweaters, shirts, dresses, and the like. Alternatively, an information beacon may be utilized with an overcoat 112 or other outer garment. Embodiments of the system may similarly be used with footwear 114, bags and luggage 116, and luxury goods 118. These examples illustrate a few of the various applications of the system of the present invention, whether by incorporation into the fabric comprising the article, or the layering of the article itself.

Figure 2:
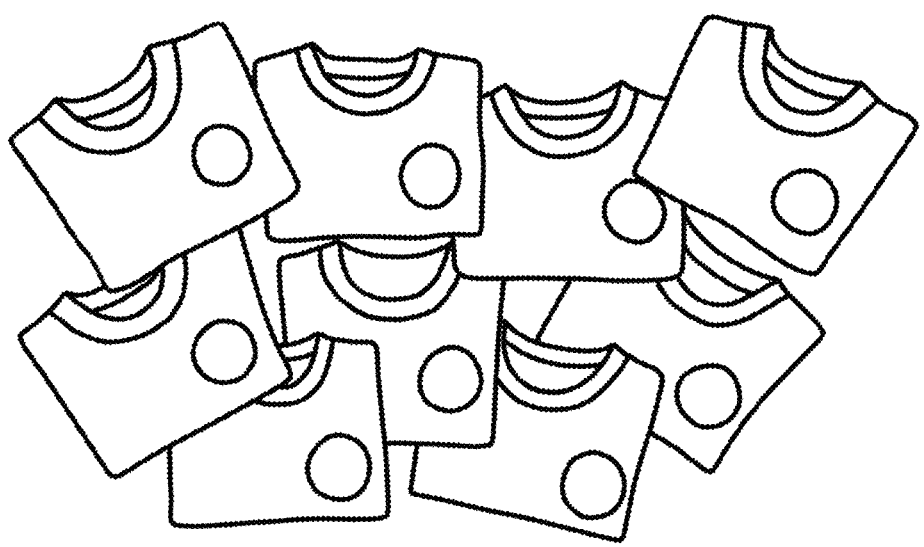
FIG. 2 shows collection of exemplary garments incorporating an embodiment of the invention.

FIG. 2 shows collection of exemplary garments incorporating an embodiment of the invention. A tee-shirt is affixed with a decal Y that incorporates a locator beacon. In this embodiment, a range of materials for tee-shirt are contemplated including cotton (whether organic, pima, Supima, Egyptian, combed, blended, or otherwise), wool, synthetic fabrics (e.g., polyester and rayon, natural fibers, or blends of any of the foregoing, whether with an elastomeric fiber or without.

Figure 3:
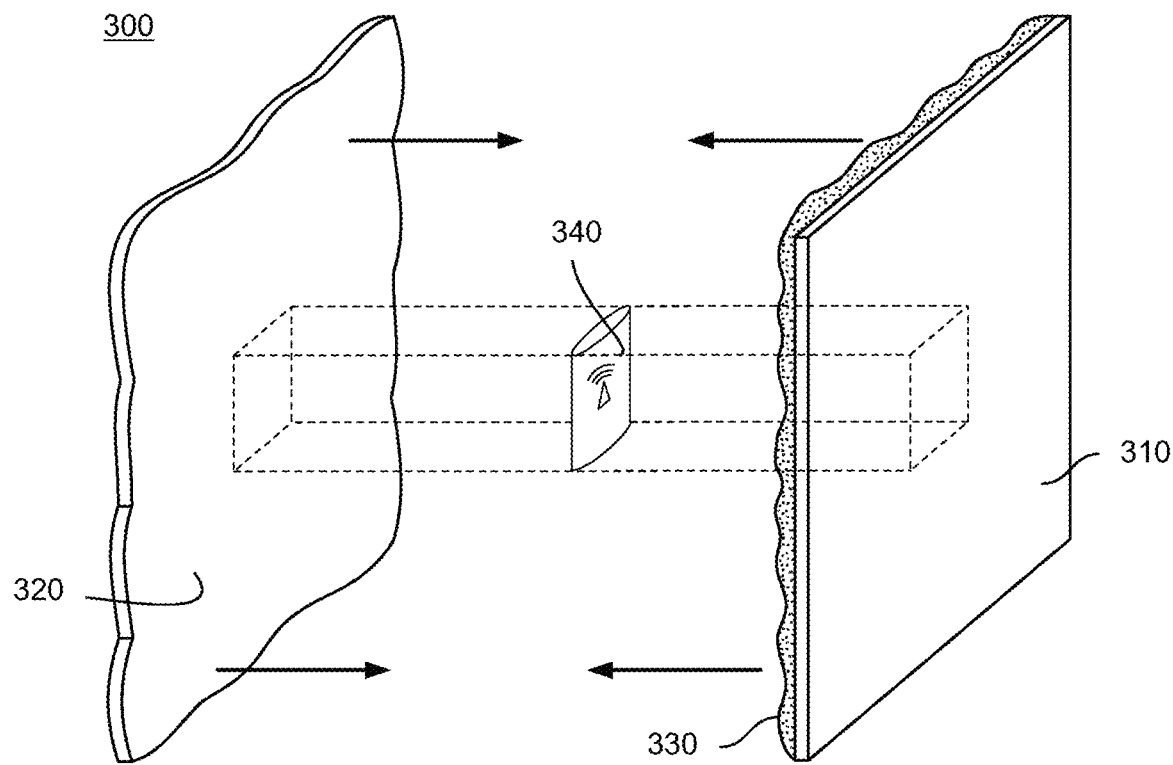
FIG. 3 shows a side view of a composite fabric structure according to embodiments of the invention in which the layers have been joined by adhesive.

In FIG. 3, a composite fabric structure 300 is shown with a first layer 310, second layer 320, and an adhesive 330 between the layers. An information beacon 340 is shown disposed between layers 310 and 320.

Figure 4:
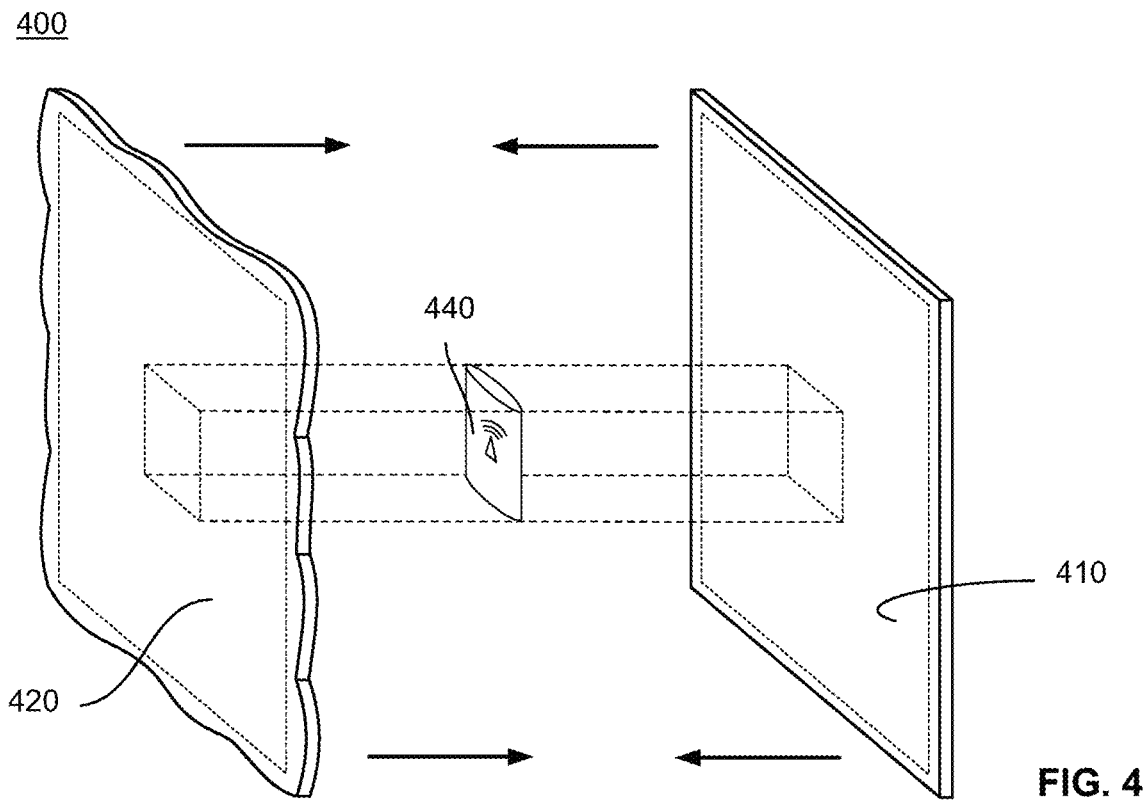
FIG. 4 shows a side view of a composite fabric structure according to embodiments of the invention in which the layers have been joined by stitching.
Figure 5A:
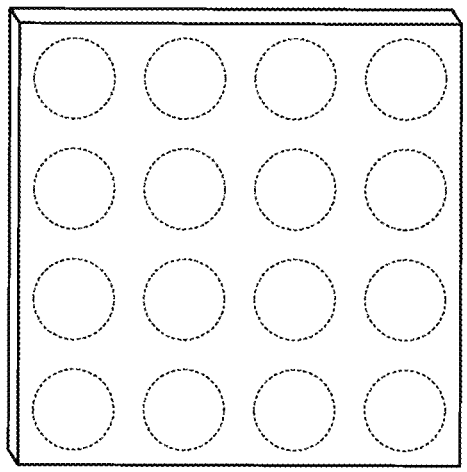
FIGS. 5A-5F show a selection of exemplary quilted stitch patterns that may be employed with the present invention.
Figure 5B:
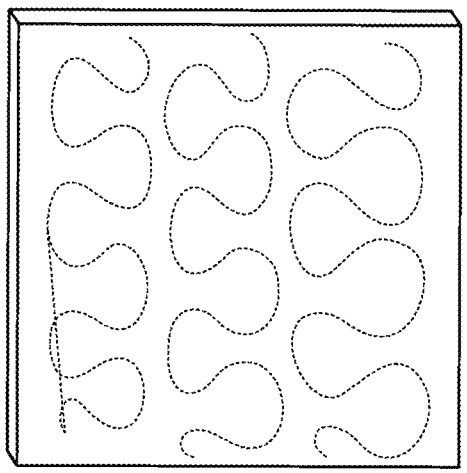
Figure 5C:
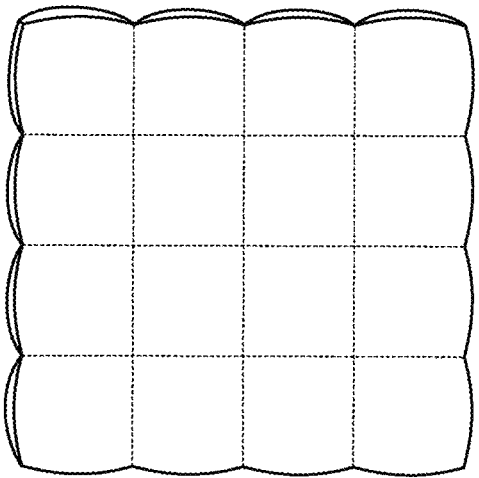
Figure 5D:
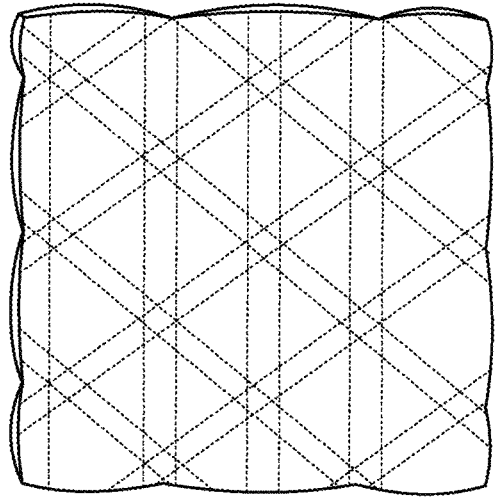
Figure 5E:
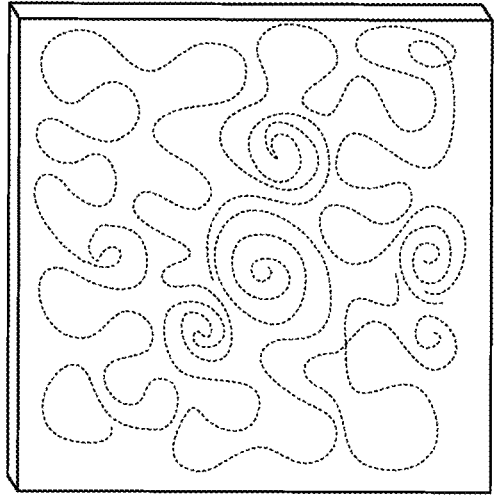
Figure 5F:
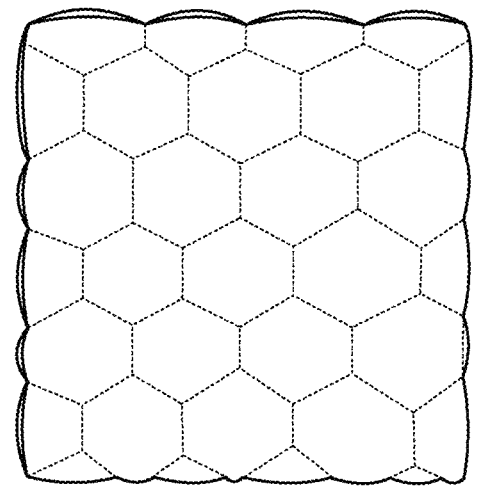

FIG. 4 shows a composite fabric structure 400 in which a first layer 410 and second layer 420 have been joined by stitching. An information beacon 440 is shown disposed between layers 410 and 420.

FIGS. 3 and 4 each show an exploded view in which the layers have been separated for explanatory purposes. The arrows indicate the direction that the opposing layers would be approached during manufacture to form a complete and integrated product.

The individual layers of material used in the various layers of the composite may be selected to match the intended use of the material. For example, a handbag embodiment may have an external surface visible from the exterior that requires a sleek and elegant appearance, while the internal surface may be driven less by aesthetics, and more by functional concerns such as wear or soil resistance. An embodiment used to fabricate an overcoat may have an external surface visible to others that is formed from a material that is durable and weather-resistant, while the internal surface adjacent the wearer's body during may require a softer material, or a material that is more conducive to embedding an information beacon.

In embodiments, a material may be chosen for its thickness, pile, softness, texture, or other characteristics, to further mask the presence of an embedded information beacon.

Several example fabric combinations are disclosed below in connection with various usages. These examples are meant only to provide illustrations of how the novel composite material can be formed.

Referring to FIG. 3, first layer 310 may comprise a durable material that is resistant to environmental factors, and also attractive. Numerous varieties of material are contemplated as coming within the scope of the invention and include, for example, animal hides such as cow skin, calfskin, lambskin, snakeskin, crocodile skin, as well as synthetic leathers such as "vegan" leathers, pleather, leatherette, and faux leather. Various non-leather materials may be used for first layer 310 including, without limitation, materials based on fibers such as cotton, hemp, linen, nylon, polyester, and the like.

A second layer 320 may be any material that is capable of being joined to the first layer 110 using the selected joining means. For example, cotton twill will readily bond to leather using an adhesive. In contrast, a thin material such as organza may be difficult to bond to leather because of its physical characteristics. Similarly, canvas may readily bond to leather with rivets, adhesive, or stitching, while lace may be less desirable because it may be difficult to hide the information beacon.

In embodiments, an information beacon may be hidden behind a garment feature such as the logo or emblem shown in FIG. 2, with the logo or emblem and fabric forming a pocket similar to FIG. 3.

The specific combination of fabric used will depend on the type of article to be sewn from the composite material and the type of information beacon embedded therein. Specific combinations that have been found to work are disclosed in the "Examples" section below.

In embodiments, a lining may be integrated adjacent to the second layer.

In embodiments, second material 320 may comprise any material that is capable of being joined to the first layer 310, and would include at least any of the materials described above for the first layer 310.

In addition to the type of fabric used, consideration may be given to the structure of full-fashion knit used in the composite. It has been found that various sweater knit structures are suitable for bonding consistent with the teachings of the present invention. For example, 3 Gauge 2×2 basket stitch knit has been used with success. Various gauges of sweater knit or other material may be used such as 1.5 Gauge, 3 Gauge, 7 Gauge, 9 Gauge, 12 Gauge, and 14 Gauge. Similarly, various textures may be utilized for the sweater knit such as jersey, rib, seed, basket, cable and any possible stitch by both machine and hand.

In the case of leather bonded to a cut-and-sewn knit, a variety of knits are contemplated as part of the invention such as Jacquard, pique, Ponte, and scuba. For leather bonded to a woven fabric, materials may be used such as twill, denim, canvas, tweed, chino, gabardine, and corduroy.

In embodiments of the invention, the composite layers are bonded together by a means that will provide a bond that is permanent or semi-permanent. In embodiments, the bond may also provide aesthetic enhancement to the layers.

Referring to FIG. 3, an adhesive 330 may be applied during manufacturing to semi permanently join the layers together. In embodiments, adhesive 330 may be a polyurethane adhesive, which has been shown to have good binding power for soft materials such as fabric, and which creates foam that seeps into small fabric gaps and forges a stronger bond when exposed to moisture, enhancing the durability of the bond during use.

Other adhesives may be used with the present invention provided that they are resistant to environmental conditions, and are durable.

Referring to FIG. 4, layers 410 and 420 are joined together by stitching. A variety of stitching patterns have been shown to work with the present invention, including a running stitch, hemming stitch, basting stitch, catch stitch, backstitch, overcast stitch, and invisible stitch, among others. Patterns may also be introduced using stitching such as geometric patterns, free patterns, grid quilted patterns, circular patterns, and the like. The particular stitching and pattern will be driven by the type of fabric used, as well as the size and type of information beacon hidden therein.

Figure 6:
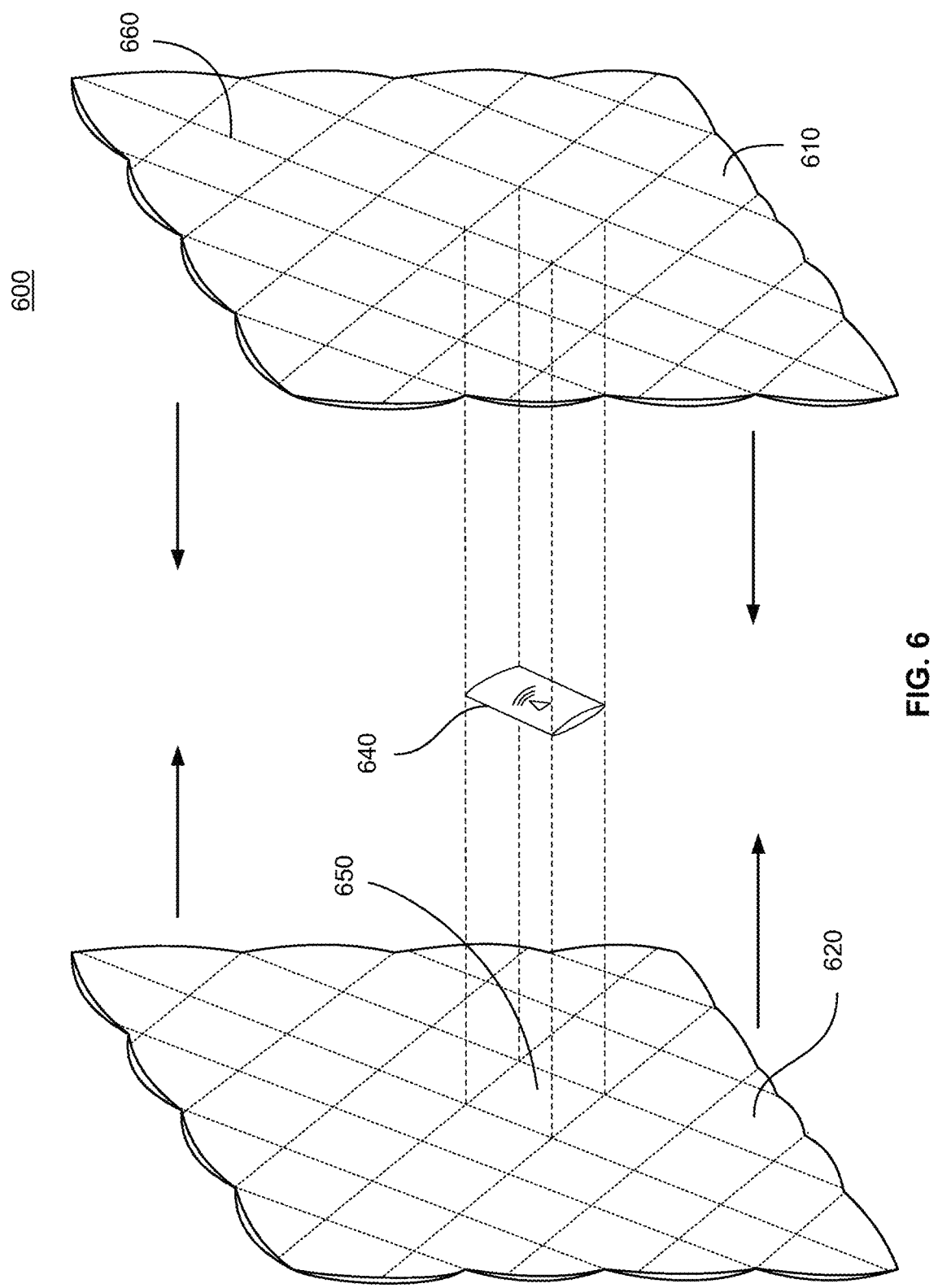
FIG. 6 shows a composite fabric in which the layers have been joined using a stitching pattern that defines a quilted pattern.

In embodiments, the joining means can be utilized to impart a decorative pattern onto the surface(s) of the composite. Referring to FIGS. 5A-5F, a variety of exemplary quilting patterns are shown that may be stitched onto the article. A quilted pattern is formed from quilt-stitching the two layers of the composite material in a decorative or utilitarian shape. Referring to FIG. 6, the application of quilting to the present invention is shown. A composite fabric structure 600 is shown with a first layer 610, second layer 620, and an information beacon 640 between the layers. Quilted stitching may be used to join layers 610 and 620 in any decorative or utilitarian pattern. In exemplary embodiments, the quilting pattern is stitched such that one or more pockets are formed between the layers and are of sufficient size to accommodate information beacon 640.

Alternative joining means are contemplated as coming within the scope of the invention. For example, rivets may be used to join the first and second layers to provide both function and a decorative appearance. In the same manner that stitching may leave un-joined regions between the layers, rivets that have been spaced apart may similarly define pockets into which an information beacon may be positioned.

It will be appreciated by those of ordinary skill in the art that the novel composite fabric disclosed herein may come in a variety of shapes and sizes, including individual swatches, pre-cut segments, and rolls, among others.

Figure 7:
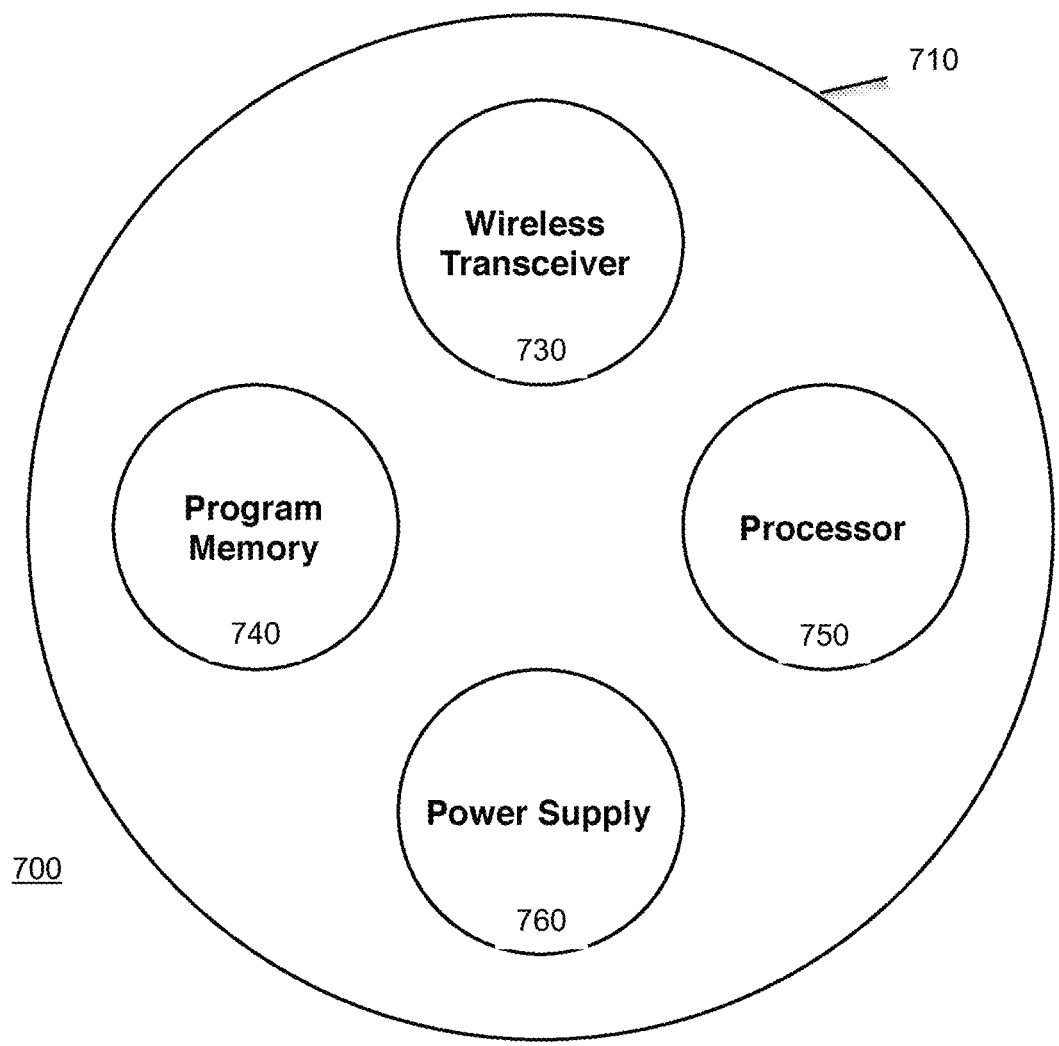
FIG. 7 shows a functional diagram of an information beacon according to embodiments of the invention.

Referring to FIG. 7, a functional diagram of an exemplary information beacon is shown. An exemplary chip may contain a water-resistant housing 710 that contains the system components. Components of an exemplary information beacon may include a SoC ("system-on-a-chip") with an integrated Bluetooth Smart (also known as Bluetooth Low Energy) transceiver 730, memory 740, central processing unit 750, and power supply 760. The nRF52832 or nRF51822 from Nordic Semiconductor are examples. In embodiments, the system components inside the housing will have a small form factor.

For example, the nRF52832 measures 3.0×3.2 mm in a quad flat no-leads package, and is powered by a CR2016 battery.

In embodiments, an information beacon may be housed in a protective shell that protects the electronic or other components from extreme temperatures (such as during a bonding process using hot melt adhesive), pressure, impact, and other forces that could impair the functioning of the information beacon. An exemplary beacon housed in a protective shell is shown in FIG. 8.

A protective shell formed around an information beacon should not, preferably, significantly impair the transmission of electromagnetic waves between the beacon and an external reader. Suitable protective shells may include epoxy, polymers, foams, and the like.

In a preferred embodiment, a two-part pressure molding process may be utilized to encapsulate the information beacon. In embodiments involving garments that are subjected to immersion in water, such as washable garments, swimwear, and the like, water may seep into electronic components causing malfunction or a failure. Where a garment is put through a washing and drying cycle, swings in temperature may result in condensation within the beacon.

In addition to moisture, high (and low) temperatures risk impairing the device. For example, a drying cycle in a home clothes dryer can reach 130° F. or higher, while commercial clothes dryers may reach 145° F. or higher, beyond the threshold for causing thermal damage to the components of the beacon. Ironing and steaming the garment may introduce even higher temperatures, and additional moisture.

It has been found that low pressure molding allows complete watertight encapsulation and thermal insulation to protect the system electronics during expected care and usage. The Technomelt product by Henkel is one example that has been found to work with the present invention.

A low-pressure molding solution may provide resistance to liquids, high temperature resistance, and superior adhesion between the molding material and system components.

Because the molding process at low pressure, the cycle time is short and fine or fragile circuitry in the beacon is not damaged.

While a low-pressure molding solution is preferred, traditional potting or encapsulating processes are contemplated as coming within the scope of the invention, and may be appropriate where conditions are less demanding or cost is a factor.

In embodiments, a shell may be formed around the information beacon during a bonding process and may utilize the bonding agent to form protective shell. For example, a bond using adhesive may encapsulate the information beacon with the adhesive used to join the layers of the composite fabric. In this manner, the beacon is both semi-permanently bonded to the composite fabric, and protected from environmental factors.

In further embodiments, a composite fabric is provided having two or more layers that are adhered or stitched together, or otherwise joined, and in which an information beacon has been embedded. The information beacon may be treated with a molding agent prior to embedding.

In embodiments, an information beacon should have a power source that is long-lasting under normal anticipated operating conditions. The choice of the power source may factor in the desired physical characteristics of the beacon since higher-capacity battery cells are generally thicker and heavier than cells with lower capacities. A thinner battery may thus provide a shorter life but present a sleeker form factor. A thicker battery may have a longer life, but may be unsuitable for applications requiring a thin, light beacon. Prototype embodiments of the invention utilized a CR1632 coin cell battery, which at under two grams in weight and measuring roughly 16 mm×3 mm (diameter×thickness), was found to be a suitable balance of life, weight, and size. It should be noted that a variety of sizes of power cells are contemplated as coming within the scope of the invention, being limited only by the application. Alternative power supplies are contemplated such as rechargeable batteries, or charging by induction.

To extend the service life of the beacon, embodiments of the invention may include an activator mechanism to power on the device. A long lead time between manufacturing and reaching the consumer—which can include multi-stage intercontinental shipping and incorporation into a finished product—may reduce the service life of the beacon. To mitigate the power loss in the device prior to reaching the consumer, a beacon may be manufactured and sealed with the power disconnected, to be activated by the consumer. However, where a beacon is encapsulated in a shell, the consumer may not, by design, have access to the components of the beacon, which are encased in a protective shell impervious to environmental factors.

In embodiments, an activator button may be incorporated into the beacon to activate the power cell without penetrating the protective shell. Referring to FIGS. 8A-8B, the top and bottom sides of a beacon comprising an activator button is shown. A hollow recess may be formed beneath the outer shell so that when a force is applied to the button region of the beacon, the shell deforms and comes into contact with the activator button, thereby starting the device.

In addition to specialized or custom information beacons, off-the-shelf components may be employed. For example, locator beacons manufactured by Tile, Pixie, and Yunzi have been shown to work with the present invention. In a preferred embodiment, a custom beacon may be developed with a form factor that complements the intended usage.

In embodiments, radio frequency identification (RFID) may be utilized and an alternative to Bluetooth. As will be appreciated by those of skill in the art, certain types of RFID may perform better than others with the system of the present invention. For example, RFID operating in the ultra-high frequency range (UHF) offer an extended range as compared to the low- and high-frequency ranges. In embodiments, near-field communications technology may be employed. The present invention is not limited to any particular wireless technology.

In embodiments, an information beacon may be activated using a Bluetooth-equipped device such as a smartphone, tablet, or personal computer. In embodiments, a Bluetooth-equipped device may utilize software to show the user where the information beacon (and thus the fabric or article incorporating the fabric) is located. In further embodiments, the location may be presented on a map on the Bluetooth-equipped device.

In embodiments, an information beacon may be configured to generate a notification when activated, such as an alarm sound or vibration.

In embodiments, an information beacon is inserted in the composite fabric during manufacturing of the fabric. In embodiments, the composite fabric of the present invention may be manufactured or delivered in uncut segments, with information beacons dispersed throughout, that are later cut for manufacturing specific items.

A system may be provided for tracking and communicating with the articles and beacons described herein. A variety of communication means are contemplated, included pairing with mobile phones and mobile computing devices, communication gateway bridges, cellular data connection, and the like. In embodiments, a gateway bridge may scan a child's information beacon when in range and provide that information to the parent. Such a system may provide not only specific location information, but tracking information as a child (or children) passes a waypoint (e.g., school bus door, school cafeteria, etc.). Exemplary gateway bridges are shown in FIGS. 9A-9B. A communication gateway bridge may be a relay that provides a secure connection.

Visualization, data, and location may be provided through mobile devices or a web portal.

Figure 10:
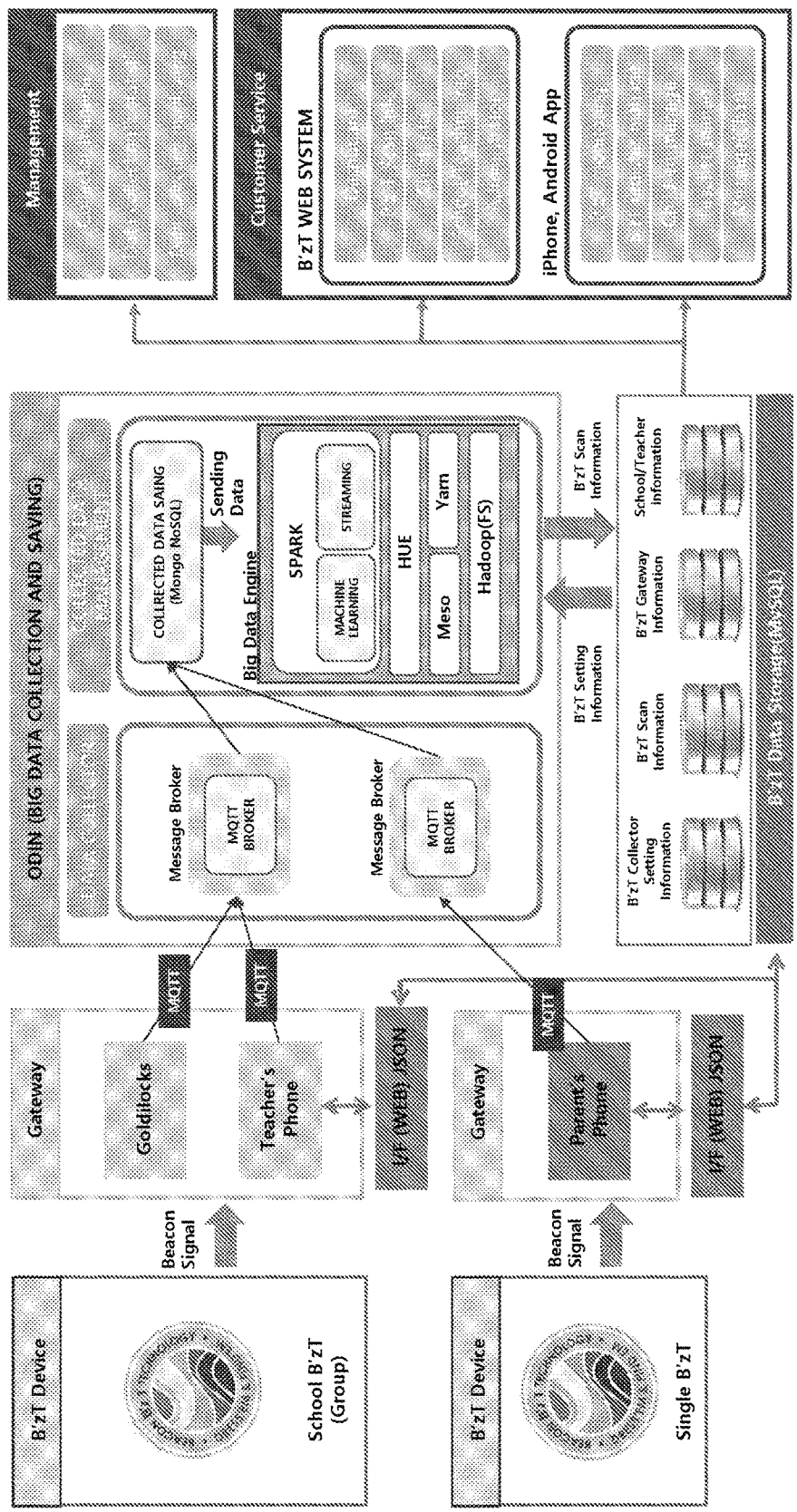
FIG. 10 shows a schematic of an exemplary system incorporating communication gateways, data processing and storage, and user interface elements.

A schematic of an exemplary system incorporating locator beacons, communication gateways, data processing and storage, and user interfaces is shown in FIG. 10.

Embodiments of the invention may be better understood with reference to the following example implementations:

Example 1: T-Shirt

A child's tee-shirt was fabricated from an organic cotton material. An information beacon was embedded in a three-dimensional animal design incorporated onto the surface of the garment. The information beacon was paired with a smartphone for providing a visual display of the location of the child.

Example 2: Child's Shoe

Referring to FIG. 8, an exemplary usage is shown in the form of a child's shoe 800. In a shoe embodiment, outer layers are formed from cow skin leather having a thickness of 1.2 mm and which has been joined to a cotton canvas lining using a self-crosslinking-type water-based polyurethane fabric adhesive. An information beacon has been embedded between the layers during manufacturing.

Example 3: Winter Coat

A winter coat was fabricated from the materials of the present invention. A mink skin was bonded to scuba (300 g/m² 96% polyester 4% spandex) using a self-crosslinking type water-based polyurethane fabric adhesive. An information beacon was embedded between the layers during manufacturing.

Example 4: Hiker's Backpack

A hiker's backpack was fabricated from the materials of the present invention. In this example, 70 D (Denier) 100% nylon standard X-Pac™ was bonded to 50 D (Denier) 100% polyester taffeta using a self-crosslinking type water-based polyurethane fabric adhesive. An information beacon was embedded between the layers during manufacturing.

Example 5: Wallet

A wallet was fabricated from the materials of the present invention. In this example, crocodile skin was bonded to pig skin with 3M spray glue 77. An information beacon was embedded between the layers during manufacturing.

Example 6: Handbag

Figure 11:
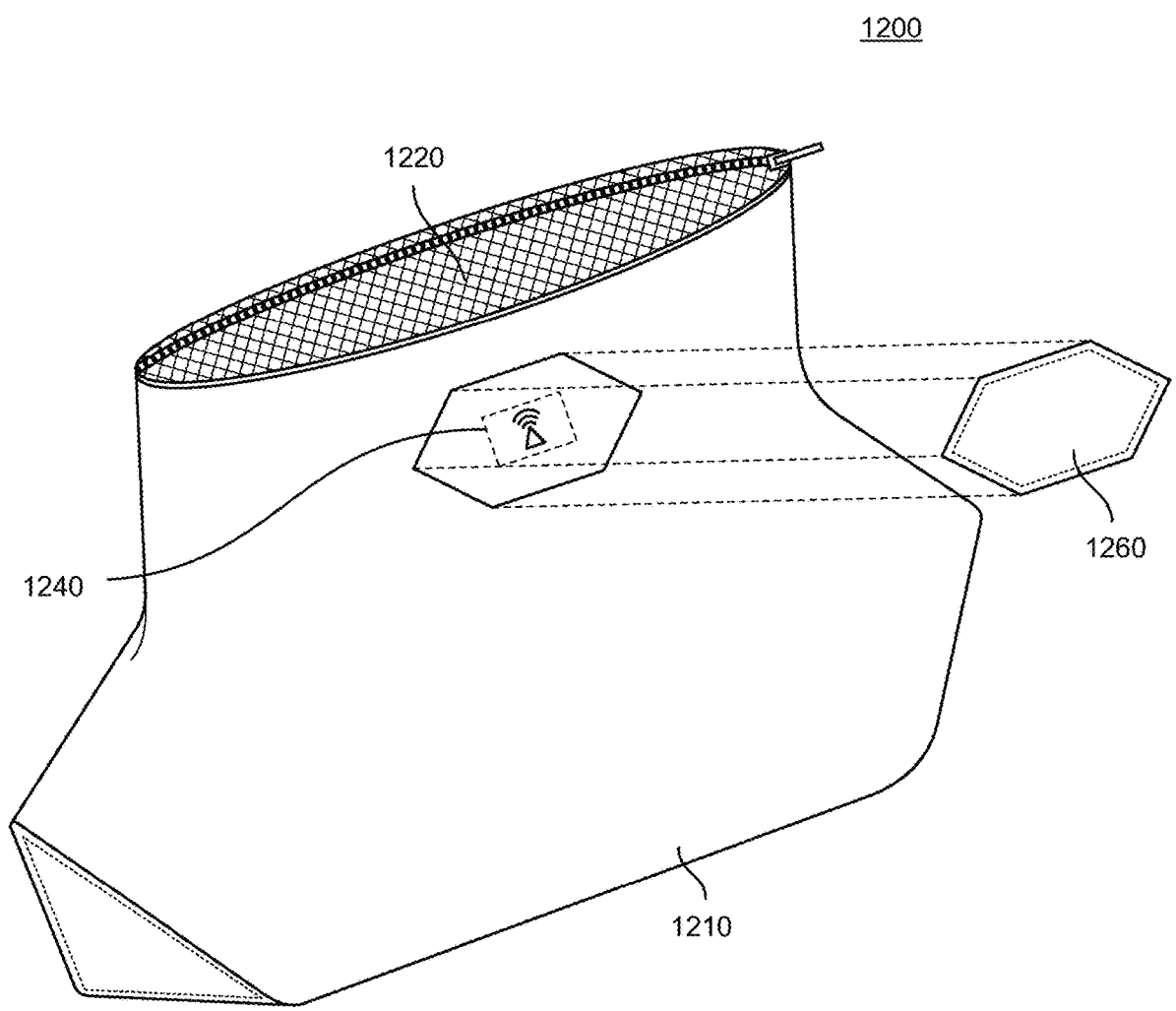
FIG. 11 shows an exemplary handbag formed from the composite material of embodiments of the present invention.
Figure 12:
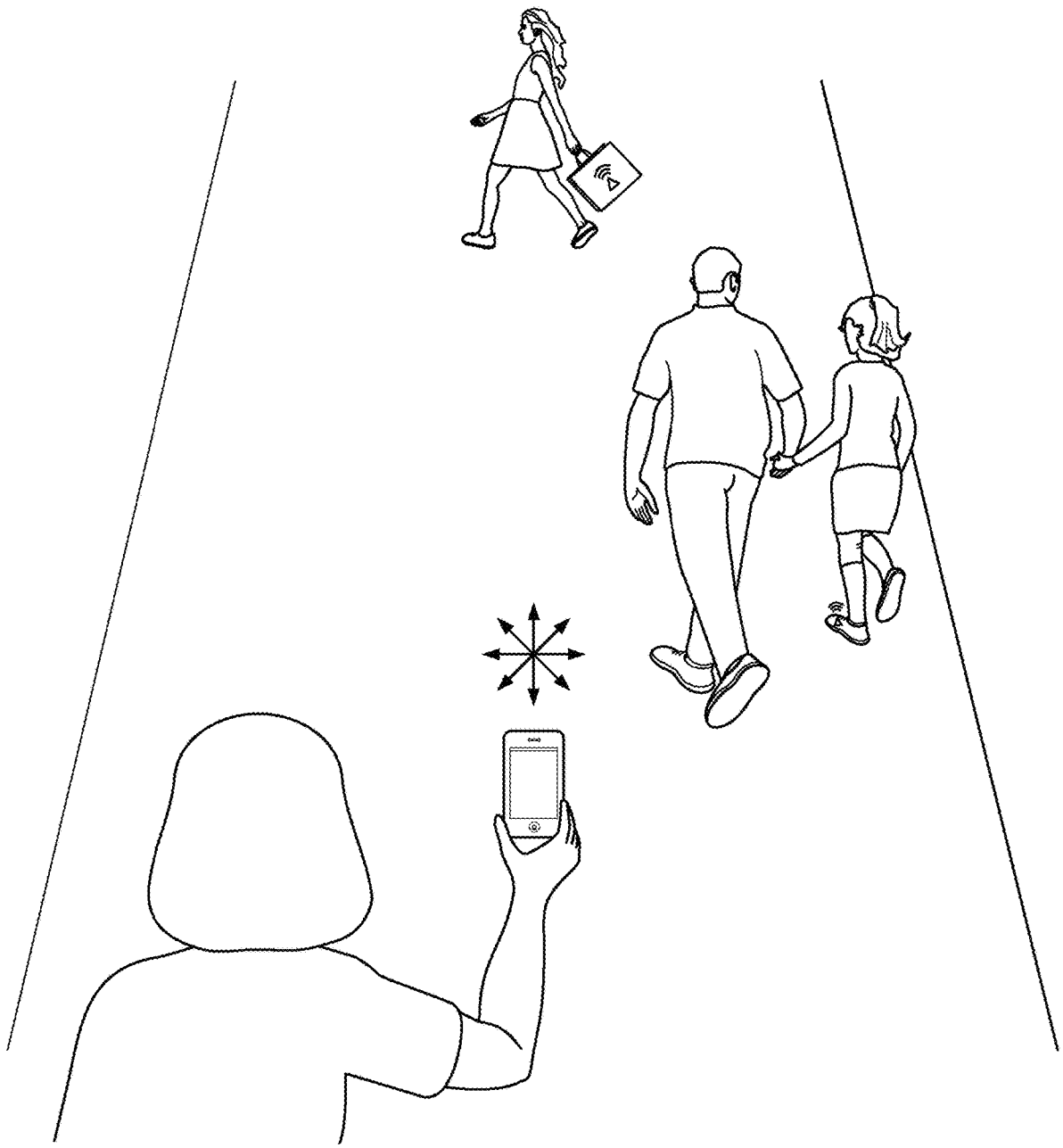
FIG. 12 shows an exemplary usage scenario for embodiments of the present invention.

Referring to FIG. 11, an exemplary embodiment is shown in the form of a woman's clutch purse 1200. Outer layer 1210 is formed from lambskin leather having a thickness of 1.0 mm that has been joined to a sweater knit lining 1220 using a self-crosslinking-type water-based polyurethane fabric adhesive. An information beacon 1240 has been embedded between the layers during manufacturing, and is further obscured by the presence of the designer's label 1260 on the exterior.

Example 7: School Bus

A school bus was outfitted with a communication gateway in encrypted and secure wireless communication with a remote server. Student uniforms were each embedded with an information beacon that was paired with the communication gateway to record the comings and goings of students on the bus, and to provide that information to the remote server where it was accessible by parents and school administrators.

Figure 13:
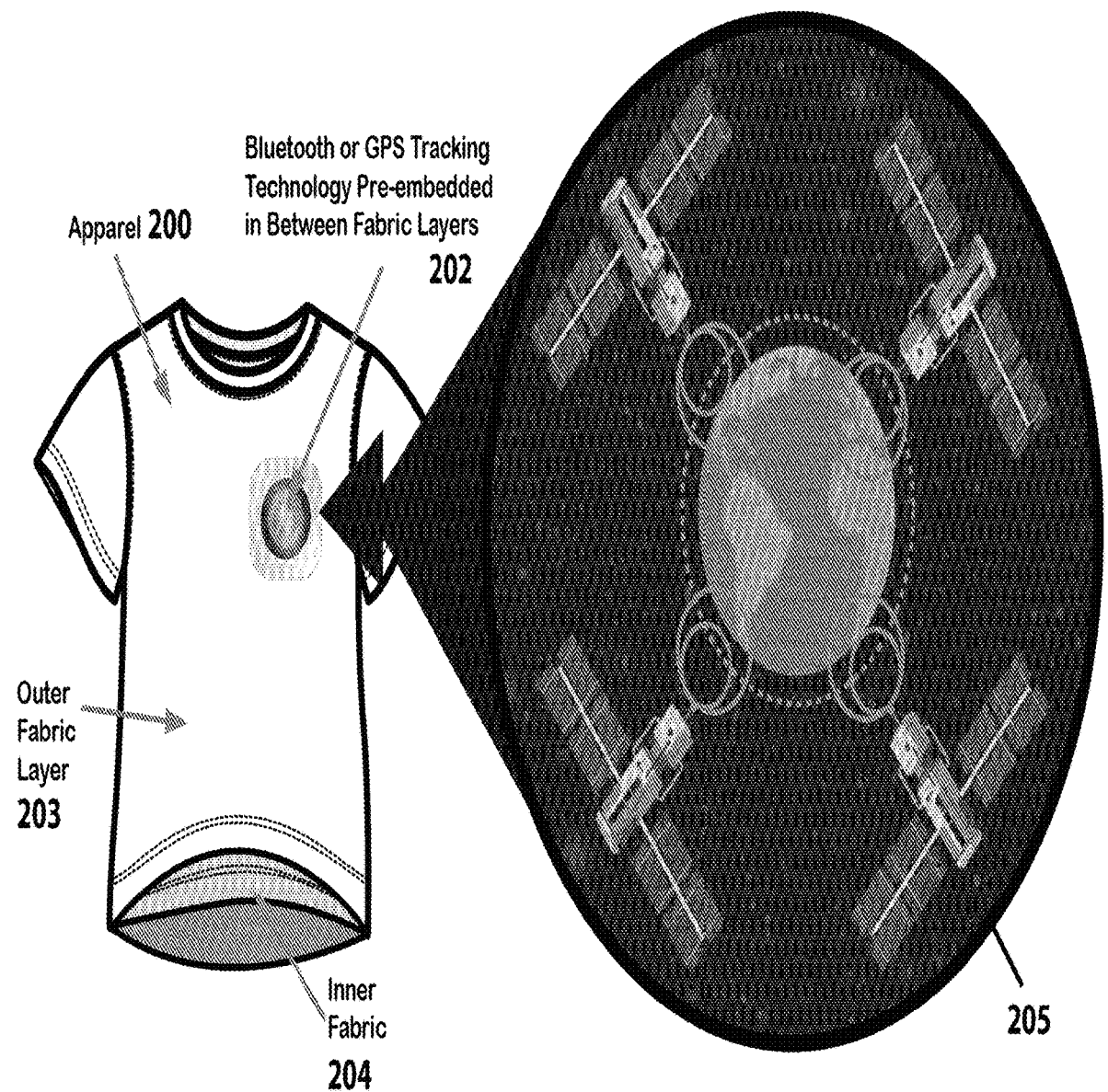
FIG. 13 shows a shirt that includes a washable information beacon.

In another implementation, as shown in FIG. 13, a shirt 200 or any other type of apparel can be embedded with a washable information beacon 202 with GPS location tracking capabilities. The washable information beacon 202 can be pre-embedded in between fabric layers 203 and 204 of the shirt as described above with the other embodiments.

The washable information beacon 202 utilizes a GPS tracking system 205. The GPS tracking system 205 can identify a location of the washable information beacon using satellite technology or any type of conventional locating system. For example, the GPS tracking system 206 can include a global positioning system that periodically updates geographic position using at least longitude and latitude information and can also indicate the location of the washable information beacon 202.

Conventional GPS tracking technologies consume a considerable amount of power during use. This power consumption requires most conventional GPS tracking technology to be hard-wired to a power source or be frequently re-charged if connected to battery power. To meet this power requirement while allowing the housing of the washable information beacon to remain water-tight and heat resistant, the washable information beacon 202 can include a rechargeable battery 214 that can be recharged using wireless energy harvesting techniques. Accordingly, instead of periodically replacing batteries, the wireless energy harvesting techniques may allow a battery of the washable information beacon 202 to be charged without the need of a wired charging source (e.g., plug-in charging). Specifically, the wireless energy harvesting can combine, e.g., rechargeable Lithium-ion (Li-ion) batteries with the wireless energy harvesting technology.

In other words, the washable information beacon 202 can include a small, self-powered GPS system that can be used to track vulnerable populations such as young children, special needs children and Alzheimer's patients, using compatible computer applications to provide the location information to a tracking server, e.g., a school or parent computing device.

Figure 14:
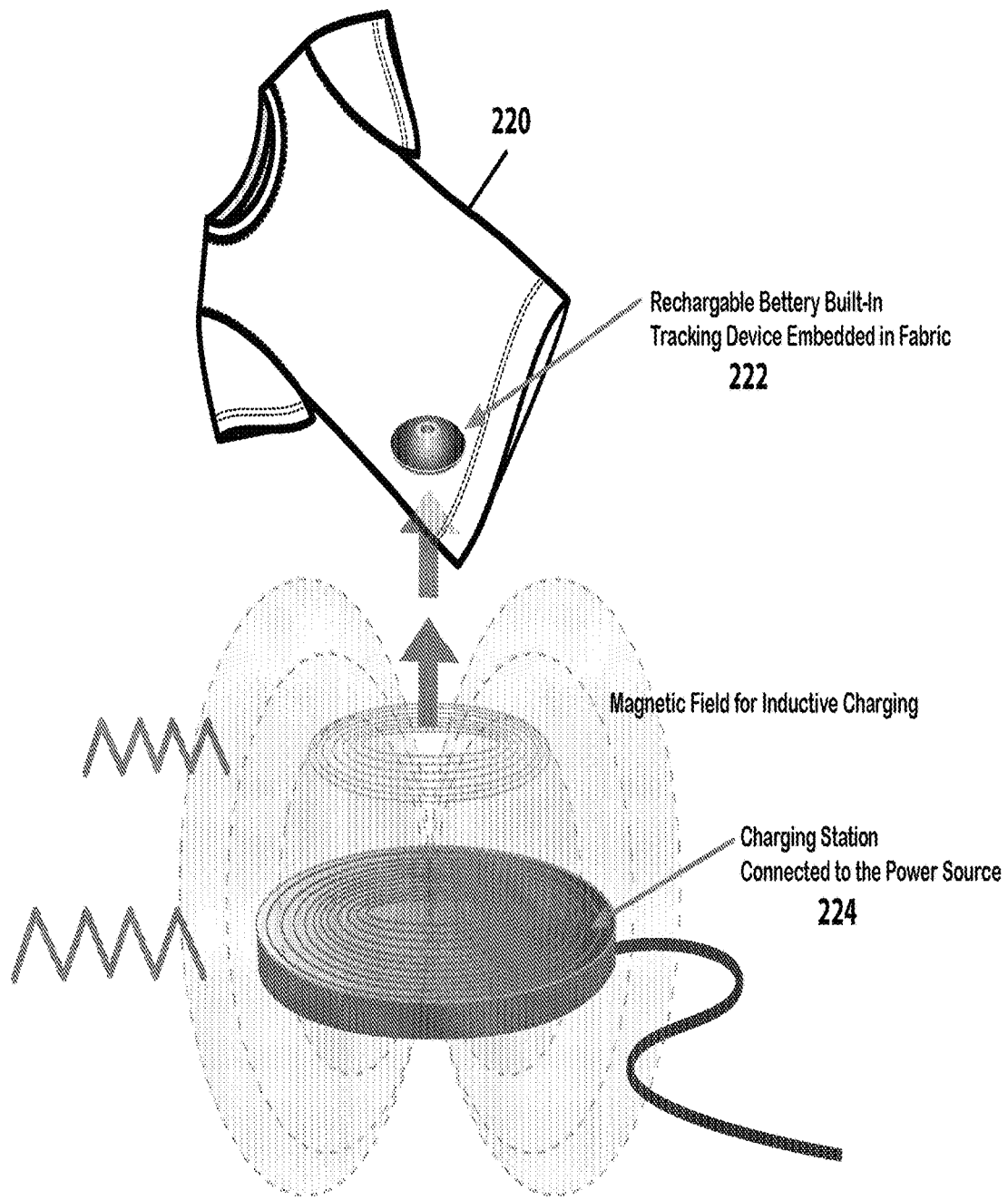
FIG. 14 shows a shirt that includes a washable information beacon and an induction charger.
Figure 15:
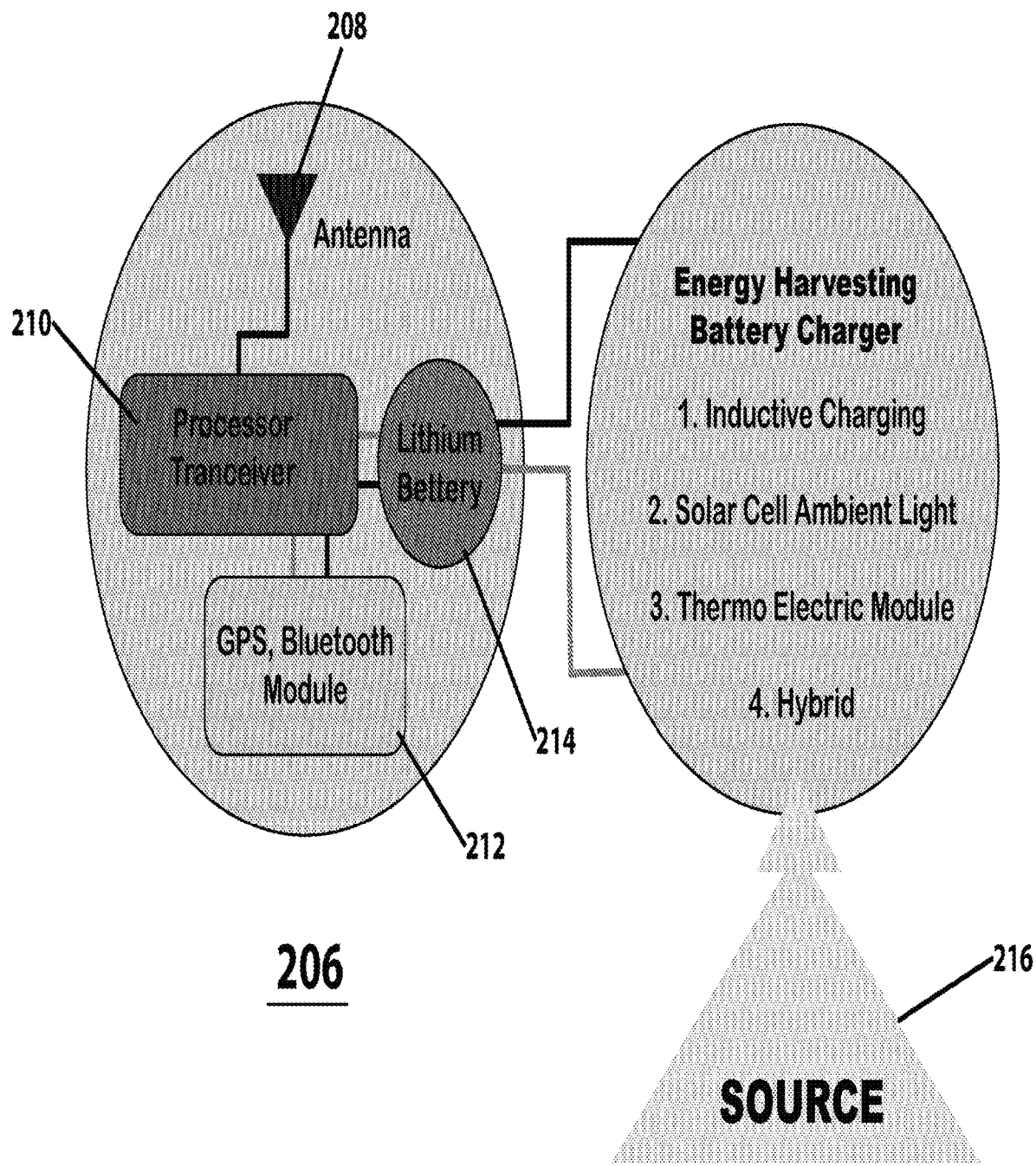
FIG. 15 shows a circuit board used with a washable information beacon.

As shown in FIGS. 14 and 15, a shirt 220 can be embedded with a rechargeable washable information beacon 222. The rechargeable washable information beacon 222 can include a GPS circuit 206 having an antenna 208, a processor transceiver 210, a GPS/Bluetooth module 212 and a battery 214. The battery 214 can be recharged using a wireless energy harvesting device 224, e.g., a wireless charging station with inductive charging. Inductive charging (or wireless charging or cordless charging) is a type of wireless power transfer that provides electrical energy to portable devices using electromagnetic waves. In use, the rechargeable washable information beacon 222 can be set on top of inductive charger 224 so that the washable information beacon 222 can be recharged.

Figure 16:
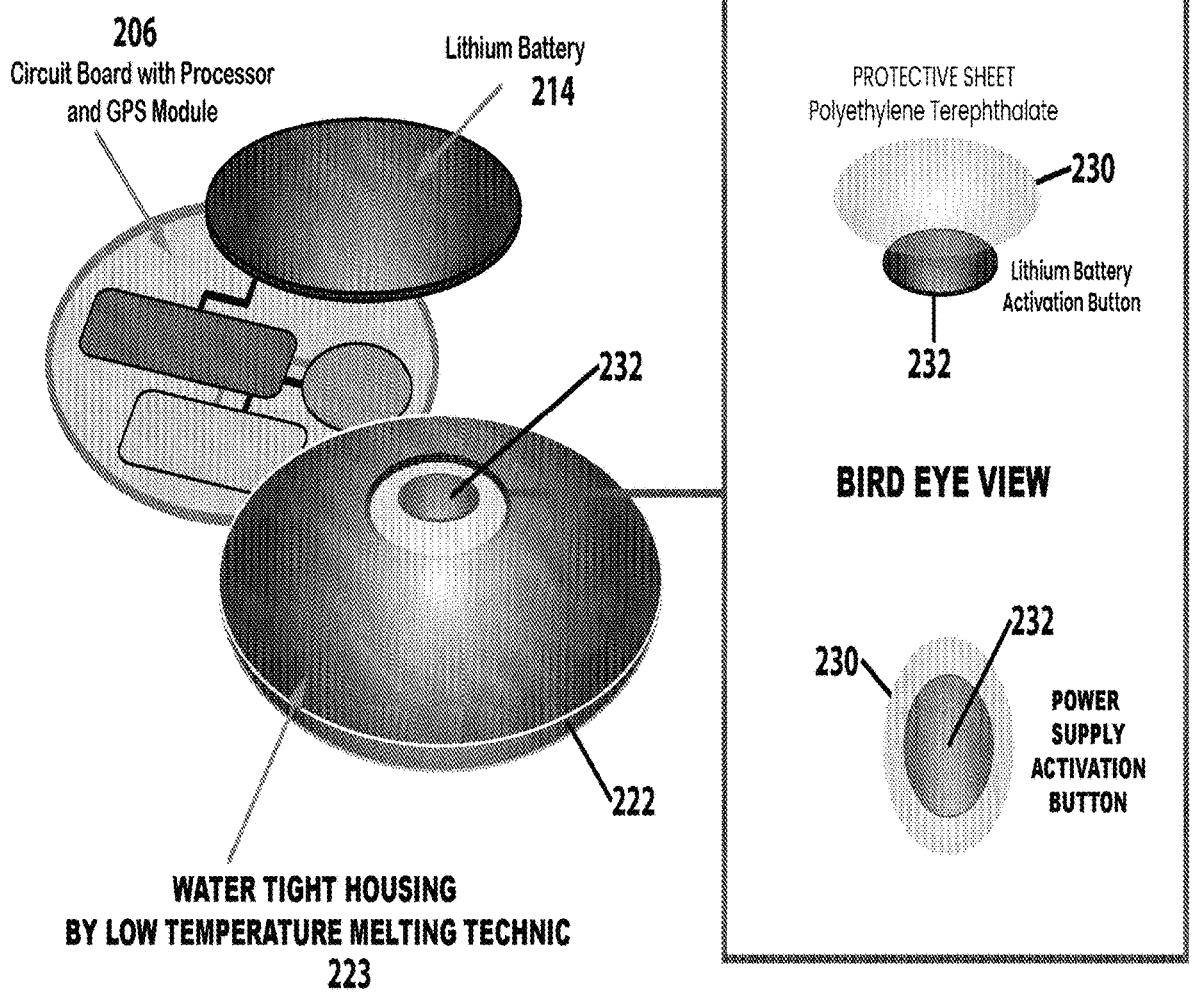
FIG. 16 shows a housing of a washable information beacon.

As shown in FIG. 16, a housing 223 of the rechargeable washable information beacon 222 can be manufactured using a low temperature melting technique as described above to form a water-tight housing. The GPS circuit 206 can be sealed within the housing 223. The housing 223 can also include a protective shield 230 made from polyethylene terephthalate for protecting a battery activation button 232 as described above in the other embodiments.

Figure 17:
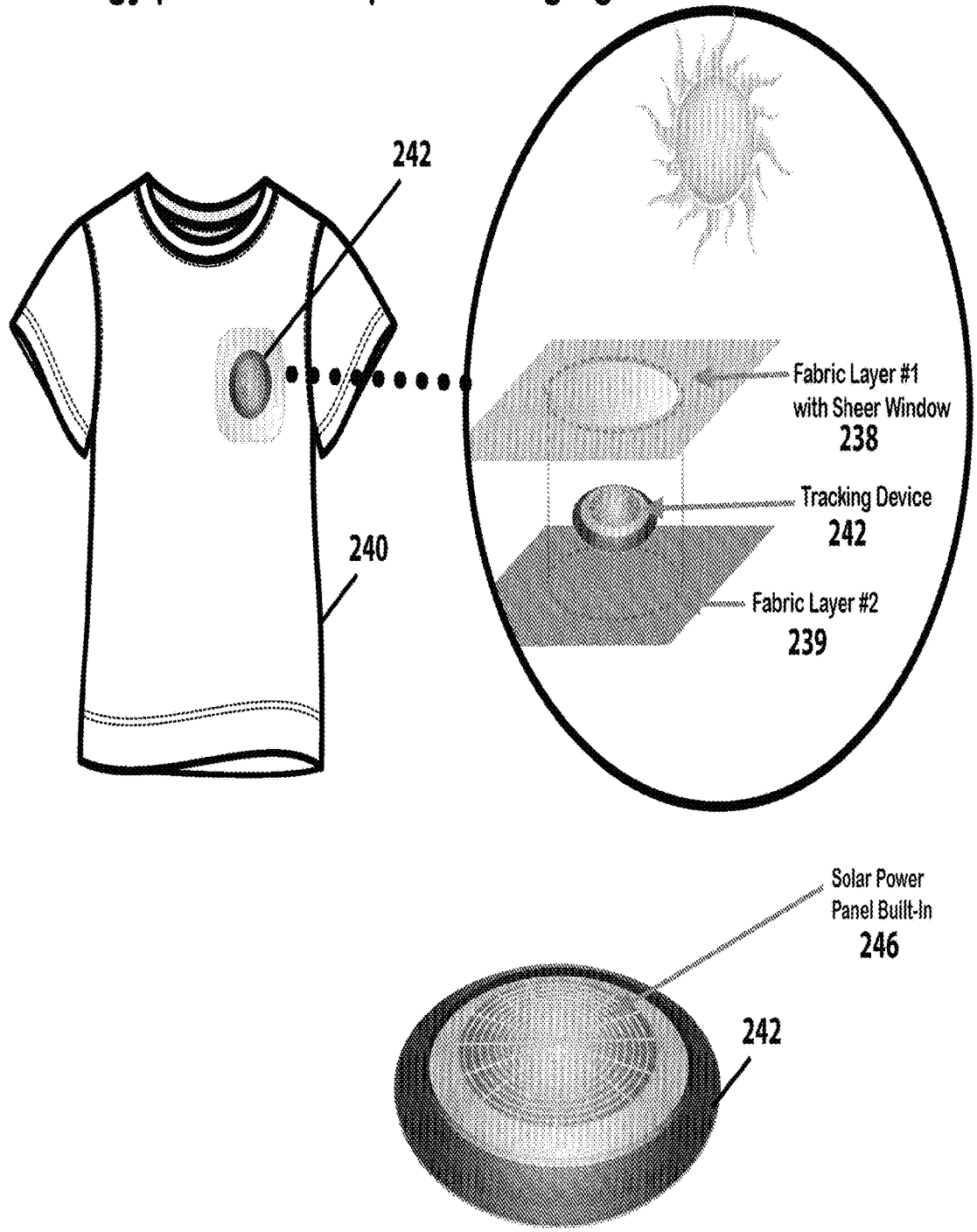
FIG. 17 shows a shirt that includes a washable information beacon.

As shown in FIGS. 17 and 18, a first fabric layer 238 and a second tracking layer 239 of a shirt 240 can be embedded with a rechargeable washable information beacon 242. The rechargeable washable information beacon 222 can include a GPS circuit 244 having an antenna 243, a processor transceiver 245, a GPS/Bluetooth module 247 and a battery 241. The battery 241 can be recharged using a wireless energy harvesting device 224, e.g., a solar cell using ambient light. A solar cell, or photovoltaic cell, is an electrical device that converts the energy of light directly into electricity by the photovoltaic effect, which is a physical and chemical phenomenon. It is a form of photoelectric cell, defined as a device whose electrical characteristics, such as current, voltage, or resistance, vary when exposed to light. Individual solar cell devices can be combined to form modules, otherwise known as solar panels. In use, the rechargeable washable information beacon 222 can be recharged using any available light source.

A housing 249 of the rechargeable washable information beacon 242 can be manufactured using a low temperature melting technique, as described above. The GPS circuit 244 can be sealed within the housing 242. The housing 242 can also include a protective shield 230 made from polyethylene terephthalate for protecting a solar PV panel 246. That is, the solar PV panel 246 can be embedded in a top part of the GPS circuit 244 and sealed with a water/moisture tight protective Polyethylene terephthalate (PEPE) sheet 248 that can withstand washing and drying cycles. The encapsulation and thermal insulation of the solar PV panel 246 and the circuit board 244 protect the circuit board 244 including the battery recharging unit through solar power supply during wear, washing, high heat drying and high heat ironing without impairing a transmission of electromagnetic waves between the washable locator system and the external reader and fabric material having the washable fabric embedded with real time GPS tracking device permanently.

Figure 19:
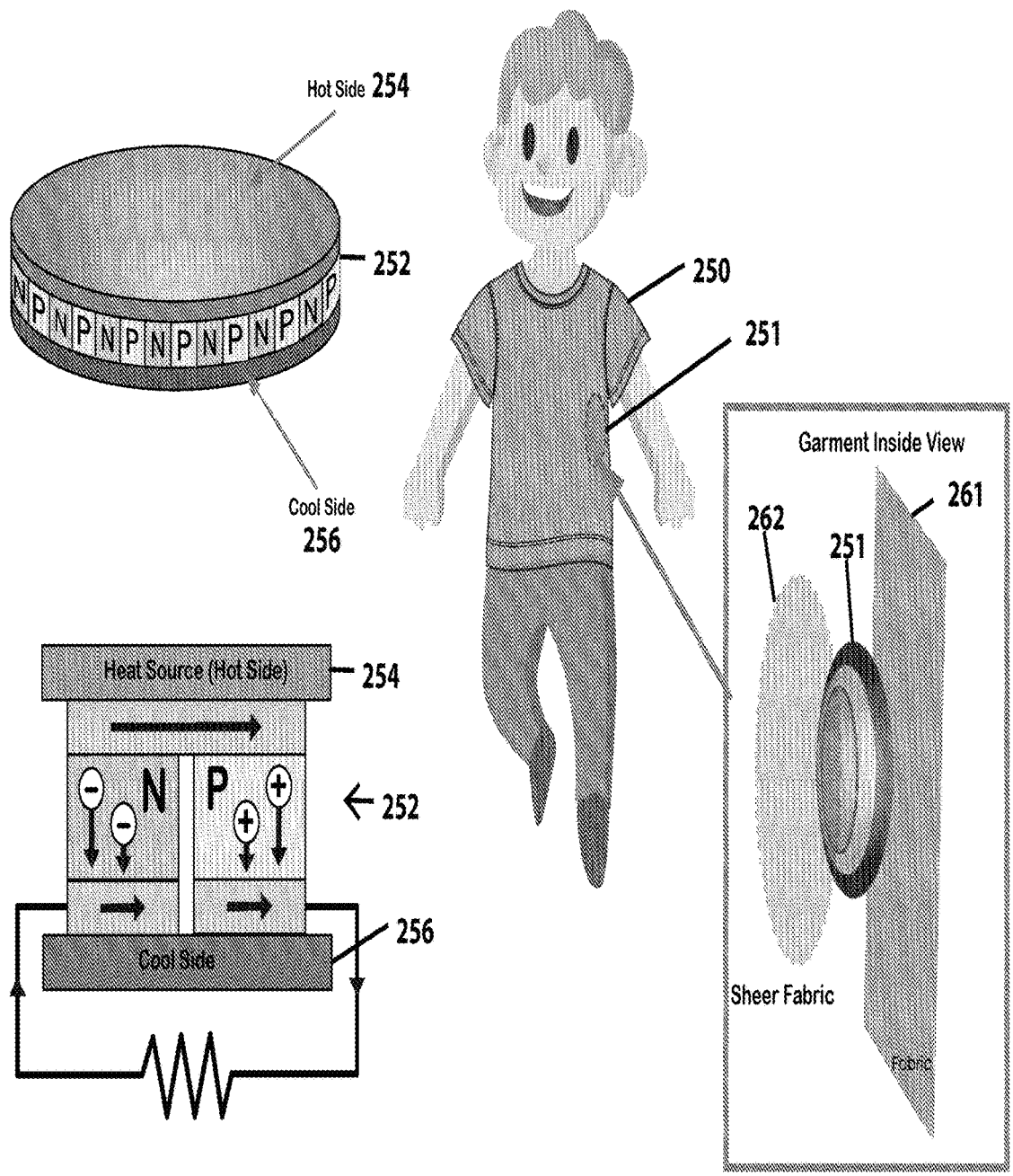
FIG. 19 shows a shirt that includes a washable information beacon.
Figure 20:
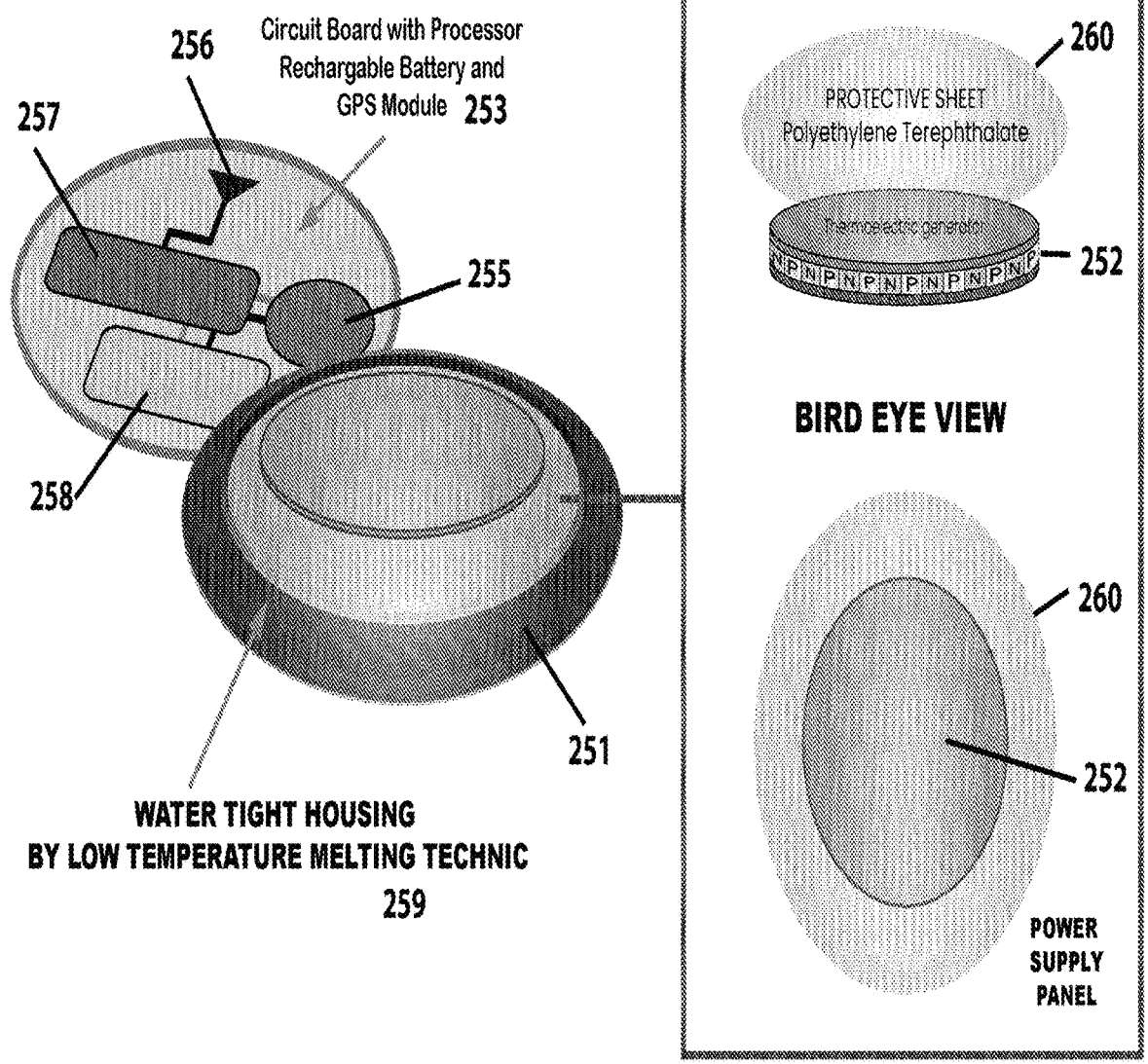
FIG. 20 shows a housing of a washable information beacon.

As shown in FIGS. 19 and 20, a fabric layer and a sheer fabric layer of a shirt 250 can be embedded with a rechargeable washable information beacon 251. The rechargeable washable information beacon 251 can include a GPS circuit 255 having an antenna 256, a processor transceiver 257, a GPS/Bluetooth module 258 and a battery 255. The battery 241 can be recharged using a wireless energy harvesting device 252, e.g., a thermoelectric generator. A thermoelectric generator (TEG), also called a Seebeck generator, is a solid-state device that converts heat flux (temperature differences) directly into electrical energy through a phenomenon called the Seebeck effect (a form of thermoelectric effect). In use, the rechargeable washable information beacon 251 can be recharged using body heat of a user.

A housing 259 of the rechargeable washable information beacon 251 can be manufactured using a low temperature melting technique, as described above. The GPS circuit 253 can be sealed within the housing 259. The housing 259 can also include a protective shield 260 made from polyethylene terephthalate for protecting the thermoelectric generator 252. That is, the thermoelectric generator 252 can be embedded in a top part of the GPS circuit 253 and sealed with a water/moisture tight protective polyethylene terephthalate (PETE) sheet 260 that can withstand washing and drying cycles.

Figure 21:
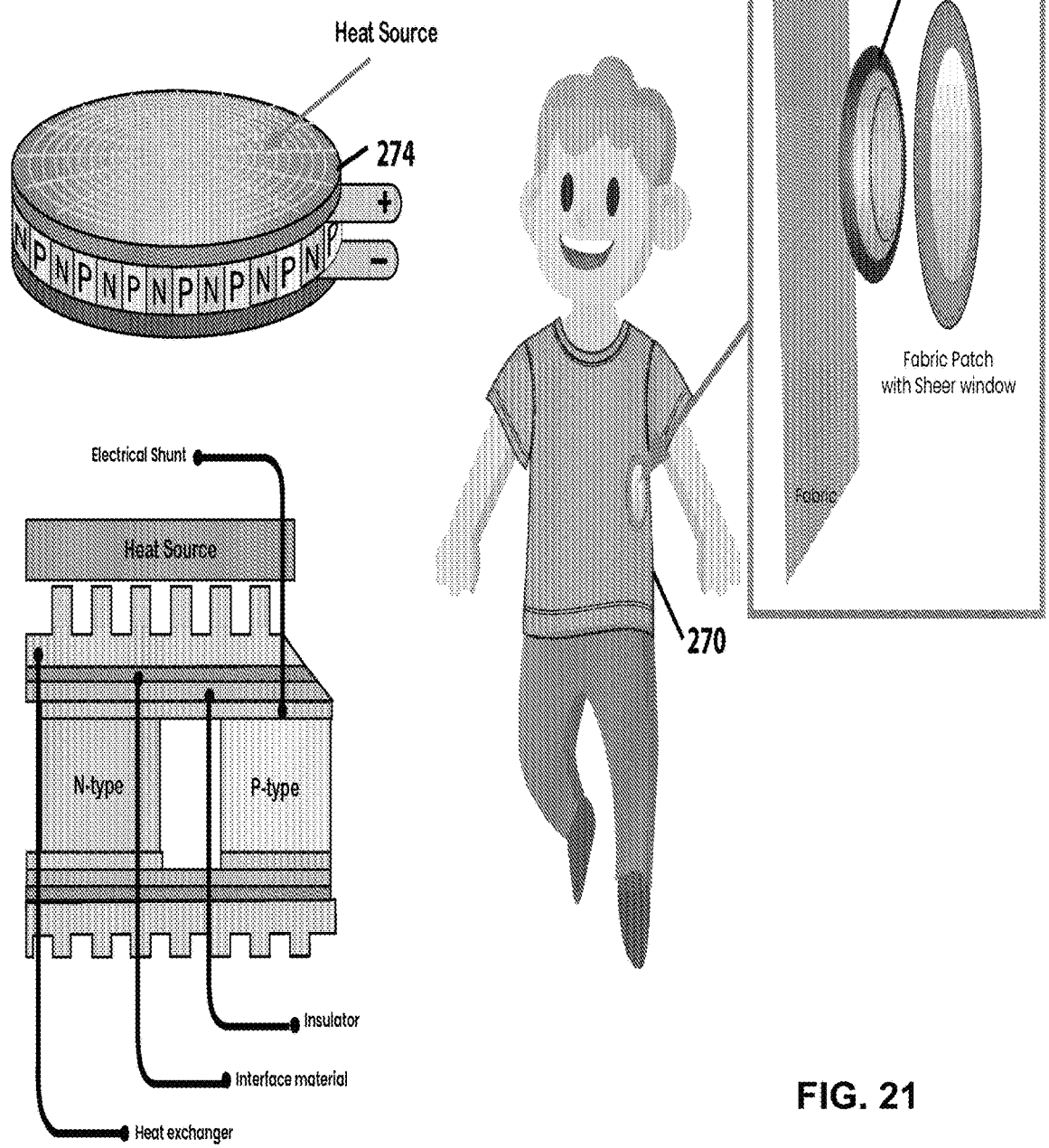
FIG. 21 shows a shirt that includes a washable information beacon.

As shown in FIGS. 21 and 22, a shirt 270 can be embedded with a rechargeable washable information beacon 272. The rechargeable washable information beacon 272 can include a GPS circuit 275 having an antenna 277, a processor transceiver 278, a GPS/Bluetooth module 279 and a battery 276. The battery 276 can be recharged using wireless energy harvesting device 274, e.g., a hybrid charging panel. Hybrid wearable energy harvesters can include a thermoelectric generator (TEG) and photovoltaic (PV) cell. PV cells can cover the outer front surface of the washable information beacon and the thermoelectric module can cover the outer rear surface. In some implementations, the thermoelectric modules can be a main power supply that constantly recharges a battery, while the PV cells can be used to provide standby power, i.e., when the shirt is not worn. Both devices can be maintenance free for their entire service life of the washable information beacon 272.

A housing 280 of the rechargeable washable information beacon 272 can be manufactured using a low temperature melting technique, as described above. The GPS circuit 275 can be sealed within the housing 280. The housing 280 can also include a protective shield 282 made from polyethylene terephthalate for protecting the thermoelectric generator 284 and PV cells 286.

In some implementations, as shown in FIG. 23, a rechargeable washable information beacon 290 can be semi-permanently embedded between two layers of fabrics 291 and 292 by sewing or fabric bonding. In some implementations, as shown in FIG. 24, two magnetic panels, a front fabric patch 294 and shirt fabric can be used together to secure the rechargeable washable information beacon 293.

Figure 25:
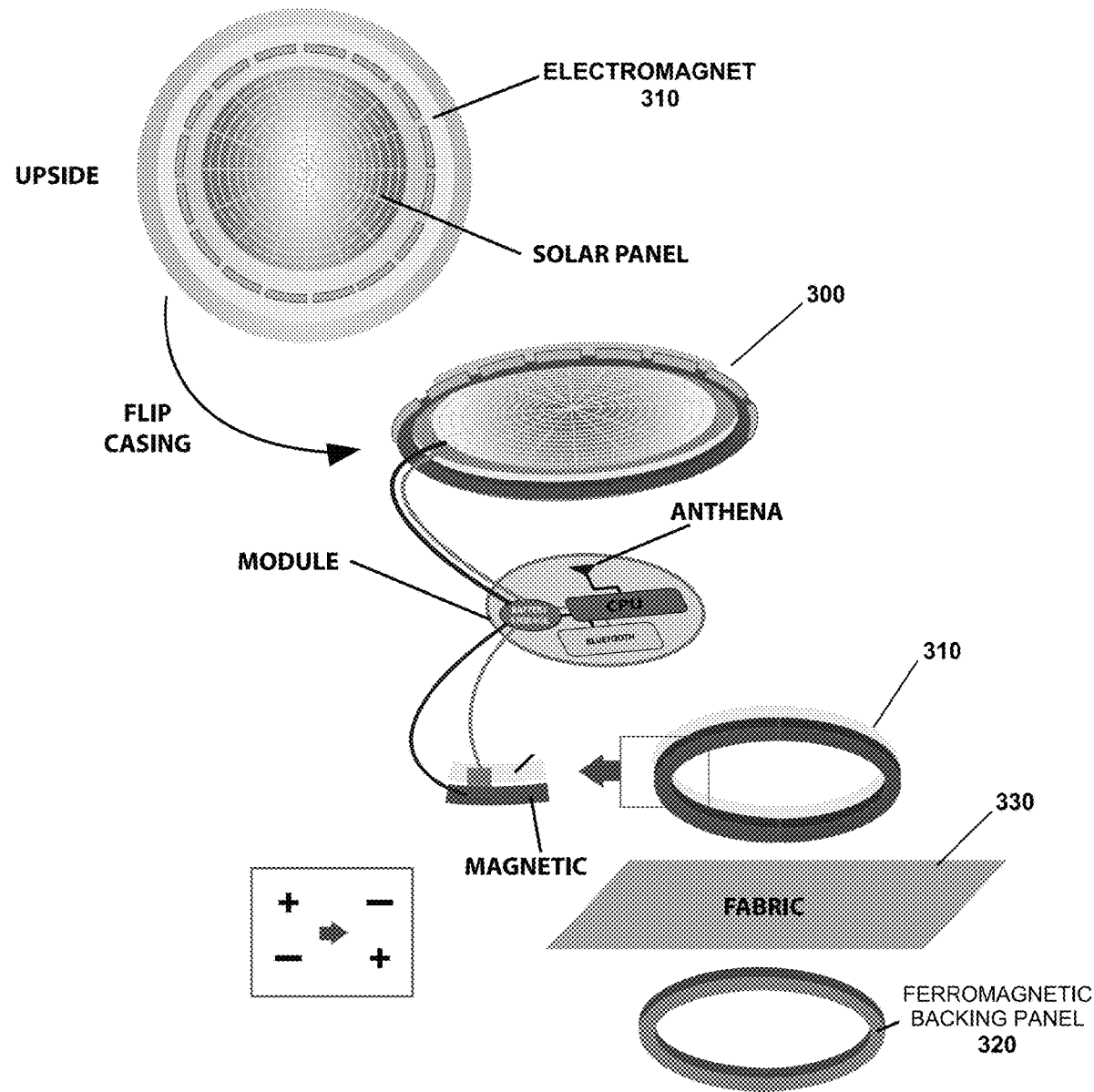
FIG. 25 shows an embodiment of a washable information beacon with electromagnetic attachment feature.

In some implementations, as shown in FIG. 25, the washable information beacon 300 can further include an electromagnet 310 therein. In addition, a ferromagnetic backing panel 320 can be provided. Between the washable information beacon 300 and the backing panel 320, a fabric material 330 can be disposed. In particular, the electromagnet 310 can be operable by remotely turning on and off the electric current applied to the electromagnet 310, and thereby activating and deactivating the electromagnet 310. By way of example, the electromagnet 310 can be activated or deactivated remotely via a smartphone application. When the electromagnet 310 is activated (e.g., by allowing the electric current to flow through the electromagnet 310), the washable information beacon 300 is attached to the backing panel 320 with the fabric material 330 interposed therebetween, and when the electromagnet 310 is deactivated (e.g., by disconnecting the electric current through the electromagnet 310), the washable information beacon 300 is released from the backing panel 320. As such, the washable information beacon 300 can be affixed to the fabric material 330, and can be released from the fabric material 330, which can be controlled remotely via a smartphone application. In some embodiments, the washable information beacon 300 can be disposed between a first layer and a second layer of a composite fabric material, and be embedded therein using the configurations discussed above. In such embodiments, the washable information beacon 300 can be embedded between the first layer and the second layer of the composite fabric material, and then be affixed to the fabric material 330.

In some implementations, the GPS circuit can be electrically coupled to a camera. The camera can include functions that allow an outside computing device, e.g., a parent's computer or smartphone, to view a real-time or near-real time environment of the end user, e.g., a child.

In some implementations, the GPS circuit can be electrically coupled to an SOS button so that an end user, e.g., a child, can signal for help in an emergency and an outside computing device, e.g., a parent's computer or smartphone, can receive real-time or near real-time alerts.

In some implementations, the GPS circuit can also include a GPS combined with cellular data subscriber identification module (SIM) card and/or Bluetooth for wireless communication.

The washable information beacon can have added functions for health monitoring, e.g., walking, sleeping or heart beats so that an outside computing device, e.g., a parent's computer or smartphone, can monitor real-time or near real-time health.

In some implementations, the washable information beacon can also include other sensing capabilities. By way of example, one or more sensors for heart beat monitoring, wetness detection, temperature measurement, blood oxygen level ($SpO_2$) monitoring or plethysmograph, mood detection, or the like can be implemented as hardware-based or software-based platforms and can be included in the washable information beacon.

It will be understood that there are numerous modifications of the illustrated embodiments described above which will be readily apparent to one skilled in the art, including any combinations of features disclosed herein that are individually disclosed or claimed herein, explicitly including additional combinations of such features. These modifications and/or combinations fall within the art to which this invention relates and are intended to be within the scope of the claims, which follow. It is noted, as is conventional, the use of a singular element in a claim is intended to cover one or more of such an element.

What is claimed is:

1. A wearable locator system, comprising: a washable information beacon including a microprocessor, a rechargeable battery, a wireless power supply, a GPS circuit, a wireless transceiver, and a memory, wherein the washable information beacon is housed in a protective shell that allows for complete watertight encapsulation and thermal insulation thereby protecting the washable information beacon during wear, washing, high-heat drying, and high-heat ironing without impairing a transmission of electromagnetic waves between the washable information beacon and an external reader, wherein the protective shell is formed from a low pressure molding process; a fabric material having the washable information beacon semi-permanently affixed thereto; and
    wherein the washable information beacon further includes an electromagnet, wherein the wearable locator system further comprises a ferromagnetic backing panel, and wherein the electromagnet is remotely operable such that when activated, the washable information beacon is attached to the backing panel with a second fabric material interposed between the washable information beacon and the backing panel and when deactivated, the washable information beacon is released from the backing panel.

2. The wearable locator system of claim 1, wherein the wireless power supply is one of an induction module, a solar cell module, a thermoelectric module, or any combination thereof.

3. The wearable locator system of claim 2, wherein the fabric material is a composite material formed from a plurality of layers, and wherein a first layer is joined to a second layer such that the wearable information beacon is semi-permanently embedded therebetween.

4. The wearable locator system of claim 3, wherein the composite material is formed prior to being cut into individual garments.

5. The wearable locator system of claim 3, wherein the composite material is joined with an adhesive.

6. The wearable locator system of claim 3, wherein the composite material is formed with stitching.

7. The wearable locator system of claim 6, wherein the stitching forms a pocket in which the washable information beacon is disposed.

8. The wearable locator system of claim 3, wherein the protective shell is formed from one of a polymer, an epoxy, or a foam.

9. The wearable locator system of claim 8, wherein the protective shell protects the microprocessor, the rechargeable battery, the wireless power supply, the GPS circuit, the wireless transceiver, and the memory of the washable information beacon from temperatures of 145° F. or higher.

10. The wearable locator system of claim 8, further comprising: a communication gateway, wherein the washable information beacon is paired with the communication gateway to record coming and goings of the washable information beacon within a specified environment.

11. The wearable locator system of claim 10, further comprising: a remote server configured to receive data related to the coming and goings of the washable information beacon within a specified environment, wherein the remote server is accessible by end users.

12. The wearable locator system of claim 1, wherein the washable information beacon further includes a cellular data subscriber identification module (SIM) card.

13. The wearable locator system of claim 12, wherein the washable information beacon further includes Bluetooth transceiver.

14. The wearable locator system of claim 13, wherein the washable information beacon further includes one or more sensors for heart beat monitoring, wetness detection, temperature measurement, blood oxygen level (SpO·sub·2) monitoring, or mood detection.

* * * * *